(12) United States Patent
Olson

(10) Patent No.: US 8,507,778 B2
(45) Date of Patent: Aug. 13, 2013

(54) SELF-ASSEMBLED POLYHEDRA

(76) Inventor: Arthur J. Olson, DelMar, CA (US)

( * ) Notice: Subject to any disclaimer, the term of this patent is extended or adjusted under 35 U.S.C. 154(b) by 805 days.

(21) Appl. No.: 12/531,292

(22) PCT Filed: Mar. 13, 2008

(86) PCT No.: PCT/US2008/003293
§ 371 (c)(1),
(2), (4) Date: Feb. 18, 2010

(87) PCT Pub. No.: WO2008/140651
PCT Pub. Date: Nov. 20, 2008

(65) Prior Publication Data
US 2010/0168439 A1    Jul. 1, 2010

Related U.S. Application Data

(60) Provisional application No. 60/906,898, filed on Mar. 13, 2007.

(51) Int. Cl.
*G01N 15/06* (2006.01)
*G01N 33/00* (2006.01)
*G01N 33/48* (2006.01)

(52) U.S. Cl.
USPC ........... 977/855; 422/102; 422/547; 438/669; 977/700; 977/902; 977/904; 977/905; 977/906; 977/915

(58) Field of Classification Search
USPC ................. 422/102, 547; 438/669; 977/700, 977/902, 904, 905, 906, 915, 840, 855, 858
See application file for complete search history.

(56) References Cited

U.S. PATENT DOCUMENTS

2006/0040103 A1    2/2006    Whiteford et al.
2007/0020310 A1    1/2007    Gracias et al.

OTHER PUBLICATIONS

International Application Serial No. PCT/US2008/003293, Search Report mailed Nov. 10, 2008.
International Application Serial No. PCT/US2008/003293, Written Opinion mailed Nov. 10, 2008.

*Primary Examiner* — Brian J Sines
(74) *Attorney, Agent, or Firm* — Benjamin C. Armitage; Billion & Armitage

(57) ABSTRACT

Self-assembling multimeric physical models of closed polyhedral structures made of structurally symmetric units, and which mimic the structure and self-assembly characteristics of naturally occurring systems such as viral capsids, are provided. Also provided are methods of creating structurally symmetric units, kits for forming self-assembling physical models of polyhedral structures, and methods of forming the same.

19 Claims, 11 Drawing Sheets

A

B a  b  c

A

B

C

D

A

B

SELF-ASSEMBLED POLYHEDRA

PRIORITY OF INVENTION

This application is a U.S. National Stage Filing under 35 U.S.C. 371 from International Patent Application Serial No. PCT/US2008/003293, filed Mar. 13, 2008, and published on Nov. 20, 2008 as WO 2008/140651 A2, and republished as WO 2008/140651 A3, which claims the benefit of priority to U.S. Provisional Patent Application Ser. No. 60/906,898, filed Mar. 13, 2007, the contents of which applications and publications are herein incorporated by reference in their entirety.

GOVERNMENT SUPPORT

The invention described herein was made with United States Government support under Grant Number EB 000798 awarded by the National Institutes of Health. The United States Government may have certain rights in this invention.

FIELD AND BACKGROUND OF THE INVENTION

The present invention relates generally to self-assembly and modeling of stochastic phenomena, and, more particularly, to pattern-selective self-assembly of component articles, spanning from the molecular level to the macroscopic range.

Nature is driven and controlled primarily by stochastic processes and events. A stochastic process is based on random occurrences of individual events, which cannot be predicted, although measuring the distribution of all observations usually follows a predictable pattern that can be quantified statistically.

An example of a stochastic event is the decay of radioactive material. While it is impossible to predict when an individual atom will undergo decay and emit radiation, the behavior of a clump of radioactive matter can be characterized by a measurable and thus predictable half-life time.

An example of a stochastic process is pressure in a gas. Even though each molecule is moving deterministically, a collection of molecules in the gaseous state is practically and computationally unpredictable. Yet the behavior of a large enough collection of molecules in the gaseous state will exhibit predictable properties which emerge from the stochastic characteristics of the system, such as filling an enclosure, exerting equal pressure on its walls, diffusing at a known rate along concentration gradients, and the likes.

Another example of a stochastic process in the natural world is protein folding. The polypeptide chain is characterized by a particular sequence of amino acids, which comprises a long polymeric molecule having many free-to-rotate backbone bonds and thus can take an enormous number of conformations. Yet, typically, a given protein will assume one particular configuration when allowed to exist in its native environment. Driven by temperature-dependent stochastic events, the protein will reach a local energetic minima manifested by a unique and functional three-dimensional structure.

Small and large natural systems are driven by stochastic process, spanning from chemical reactions, via the assembly of multi-component systems to the planetary weather system and the earth tectonic movements. Modeling such events and processes has challenged natural scientists, mathematicians and computer experts for decades. Super-computer still struggles to solve problems and to depict even simple stochastic systems, thus the formidable hurdle of measuring and fully describing such systems remains a challenge.

The formation of a viral capsid is a classical example of a stochastically controlled process of an assembly of a multi-component system, wherein multiple individual units, namely capsomeres, self-assemble to form the capsid. A capsomere is often a complexed yet symmetric multimeric structure which is comprised of several sub-structural units, each made of several protein chains having distinct sequences (viral coat proteins). After solving several crystal structures of viral coat proteins, capsomeres and intact whole capsids, scientists turned to the question of the metrics of such smilingly simple stochastic assembly process of inanimate objects, which is undoubtedly one of nature's wonders.

A capsomere is a protein-based subunit of a viral capsid, designed to have strong affinity to other identical capsomeres so as to form a particular structure and, upon reaching a minimal number of subunits, self-assemble to form that structure, namely the capsid. Many viral capsids are spheroids, or have one circular dimension (cylindrical, helical etc.). The sphere is the simplest finite surface that partitions space. Nature uses this form at all scales in both the inanimate and living world for the basic physical property of encapsulation. Spherical virus capsids, for example, enclose space by utilizing the geometry of the icosahedron, thus exploiting the economy of this form in terms of both surface-to-volume ratio and genetic efficiency of subunit-based symmetric assembly.

Icosahedron-shaped capsids have six 5-fold rotation axes, ten 3-fold axes, and fifteen 2-fold axes, providing equivalent environments for 60 identical subunits, similar to a pentakis dodecahedron, which is a truncated icosahedron having 60 faces. Icosahedral symmetry provides the largest surface-to-volume ratio for identical assembly units, and many virus capsids, such as the bean pod mottle virus, the turnip crinkle virus, the picornaviruses (family Picornaviridae, a large group of the smallest known RNA viruses), the comovirus and the poliovirus, utilize this symmetry to create particles ranging in size from 200 Å to 2000 Å (see, FIG. 1). Such capsids form spontaneously from their components under the proper conditions, and come apart under other conditions, facilitating the viral life cycle. The ubiquitous icosahedral symmetry characterizes many other natural objects, including microscopic quasicrystals and Buckminsterfullerene (C60), which are characterized by a small interior that can accommodate single atoms or small molecules.

There are several reasons why viruses adopt icosahedral symmetry. One is that triangulating (dividing into three-sided polygons) a dome into twenty is the most efficient way of producing a shell of equivalently bound identical structures. This arrangement of twenty triangles also forms a stable structure from minimal free energy considerations, however all known viruses have more than twenty coat proteins. Viral coats are assumed to have more than twenty proteins due to size consideration, namely the volume enclosed by twenty protein subunits would not be sufficient to encapsulate the genetic material needed for the viral replication. Another reason there are no icosahedral viral capsids with only 20 proteins is that the individual proteins themselves would have to exhibit perfect 3-fold symmetry. Since it is theoretically impossible for a single protein chain, having two ends, to posses true 3-fold symmetry, it is genetically more efficient for three identical protein chains to assemble and form one symmetric trimer. Sixty subunits can easily be arranged symmetrically to form an icosahedron, yet only very few viruses have such a small number of coat proteins, mostly since it is difficult to maintain an integral particle with a small number of subunits from free energy considerations.

Icosahedral viral capsids typically comprise 60×T coat proteins, wherein T is oftentimes referred to as the triangulation number, and takes the values of 1, 3, 4, 7, 9, 12 and even higher. Each of the twenty facets of a T=1 icosahedron has an actual icosahedral 3-fold symmetry; hence each triangle can be subdivided into 3 equal subunits. Considering each subunit contains one coat protein, the capsid comprises a total of 20×3=60 coat proteins; each protein is in exactly the same neighboring environment as all the others, and the coat proteins are all chemically identical, namely, have the same amino acid sequence. If the proteins which constitute together the viral coat are not chemically identical, and the proteins are quasi- or pseudo-equivalent, then a quasi 3-fold axis is formed and typically referred to as a pseudo 3-fold axis. However, the different protein chains of the poliovirus and rhinovirus are not quasi-equivalent, but rather assemble into the basic building block of a T=1 structure. The triangulation number of poliovirus and rhinovirus is mathematically T=1, yet the structure of the virion closely resembles that of a T=3 virus and thus these viruses are said to posses a p=3 triangulation number, namely a pseudo-T=3 number. Quasi-equivalence occurs when identical protein chains form a capsid with T>1 (i.e. when there are more than 60 identical units in the capsid), in which case the environments around the identical chains cannot all be exactly identical. However, more than sixty subunits cannot be arranged in an equivalent fashion in an icosahedron, namely some will experience a different neighboring environment than others. In a T=3 virus, such as poliovirus, there are 3 different subunits per 60 triangles. The bean pod mottle virus is subtly different; it is composed of 60 triangular units, as in a pentakis dodecahedron, wherein each unit is composed of 3 antiparallel beta-barrel coat proteins. The minimum free energy solution for a T=4 virus, such as the hepatitis B virus, is to further divide each triangle into four triangles and place a subunit at each corner, thus there will be 12×20=240 coat proteins, with 12 pentamers and 30 hexamers, which do not experience an equivalent environment except 180 of them while the remaining 60 are making similar contacts and are said to be quasi-equivalent.

The structure of the envelope (outer coat) of the human immunodeficiency virus (HIV) has an overall shape which is considered to be icosahedral, having a skewed icosahedral symmetry with a triangulation number of 71. The capsid of HIV is also icosahedral and may contain 1890 coat proteins with a triangulation number of 63. It is still unknown if the nucleocapsid of HIV (inner-most coat) adopts an icosahedral structure, or a helical nucleofilament structure.

It is evident that the challenge of truly describing natural stochastic assemblies such as the formation of an icosahedral capsid from its capsomeres is still beyond currently available supercomputing machines, and hence has not been modeled computationally at the absolute level heretofore. A solid or rigid model which can represent a physical analog of a stochastically assembled system, capable of simulating these self-assembly and disassembly processes and take into account all the abovementioned symmetry and energy considerations, including the complexity of the coat-protein population, its environmental-, sequence- and structural equivalency, quasi-equivalency, nonequivalency and interrelationships etc., is also a formidable challenge, practically unattainable hitherto.

U.S. Application having publication number 20050227213 teaches a molecular modeling kit that comprises three-dimensional bodies, which provide a physical representation of one or more atoms that can attach to one another by self-reorienting magnets. As much as these bodies can represent atoms such as carbon atoms, at least in the sense of the number of bonds each atom can form, these bodies are not designed to self-assemble into a defined structure and hence must be constructed by hand.

U.S. Pat. No. 4,836,787 teaches a construction kit educational aid and toy which comprises sheet material building units in the shape of different regular polygons having strips of hook-and-pile fastening materials along their side edges. According to the teachings of this patent, different units can be connected edge-to-edge by simply placing the desired edges in contact to form a wide variety of two-dimensional or three-dimensional arrays or shapes. However, other than providing the means to construct three dimensional symmetric solids, U.S. Pat. No. 4,836,787 does not teach any of the basic aspects of forming a model of a closed, self-assembled chemical multimer (e.g., a model of icosahedral capsid assembly, such as self-assembly and capsomere/subunit/coat protein lack of equivalency).

U.S. Pat. No. 5,906,530 teaches polyhedral structural systems of releasable joined balloons, which can be used as a novelty article, an educational mean, or play item. According to the teachings of this patent, the system comprises modular inflated cells having connection members placed about each cells periphery, and configured to form various polyhedral shapes. Again, as in U.S. Pat. No. 4,836,787, other than providing the means to construct three dimensional symmetric assemblies, U.S. Pat. No. 5,906,530 neither teaches self-assembly nor other basic aspects of forming a model of a closed, self-assembled chemical multimer such as icosahedral capsid assembly.

U.S. Pat. No. 6,507,989 teaches self-assembly of mesoscale objects, which include component articles that can be pinned at a fluid/fluid interface, or provided in a fluid, or provided in proximity of a surface, and caused to self-assemble optionally via agitation. According to the teachings of this patent, a self-assembling electrical circuit can be constructed. While U.S. Pat. No. 6,507,989 teaches a physical model of a self-assembled system, it fails to provide the means to self-assemble a highly symmetrical three-dimensional object, let alone an icosahedral. It also fails to address the issue of dissimilar subunits, which are typical and essential to viral capsid formation.

Other disclosures, such as U.S. Pat. Nos. 6,517,763 and 7,007,370, teach self-assembled super-structures composed of three-dimensional and highly symmetrical sub-structures, but fail to teach the self-assembly of the symmetrical sub-structures or any of the concepts of the stochastic assembly of viral capsids.

The tools and methods for creating physical models of macromolecules exist and used for almost a century, as presented by Bailey, M. J. et al. in "*The use of solid physical models for the study of macromolecular assembly*" [Current Opinion in Structural Biology 1998, 8:202-208], yet these models are typically used to study the outer surface of macromolecules and their interactions with the outer surface of others in a static manner, and are not used to study dynamic stochastic processes.

There is thus a widely recognized need for, and it would be highly advantageous to have, a physical analog which can model stochastic assembly of viral capsids and other self-assembled structures, devoid of the above limitations.

SUMMARY OF THE INVENTION

According to one aspect of the present invention there is provided a method of creating a closed and self-assembled multimer model structure, the method includes:

(a) providing several structurally symmetric units that form the self-assembled multimer structure, each of the units having several types of basic components, the basic components comprise more than one type of attachment entity being positioned in or on a portion thereof, the units having structural complementarity to one another so as to form the closed and self-assembled multimer structure upon inducing proximity and orientation of the attachment entities; and (b) encouraging the units to physically interact therebetween via the attachment entities, thereby creating the closed and self-assembled multimer structure.

According to features in preferred embodiments of the invention described below, the closed and self-assembled multimer structure is a physical model of a closed and self-assembled chemical multimer structure, whereas the structurally symmetric units are atomic model units of structurally symmetric chemical monomers that form the self-assembled chemical multimer structure.

According to further features in preferred embodiments of the invention, the attachment entities are for modeling chemical affinity moieties of the structurally symmetric chemical monomers.

According to still further features in preferred embodiments of the invention, encouraging the units to physically interact therebetween is effected by applying a kinetic energy to the structurally symmetric units.

According to still further features in preferred embodiments of the invention, kinetic energy is applied via a technique selected from the group consisting of shaking, agitating, afloating, mixing, tossing, tumbling and colliding.

According to still further features in preferred embodiments of the invention, the attachment entities are directional.

According to still further features in the described preferred embodiments, the attachment entities are selected from the group consisting of magnetic entities, electromagnetic entities, static charge entities, hook-and-loop entities, spline-and-groove entities and a combination thereof.

According to still further features in the described preferred embodiments, the self-assembled multimer structure is selected from the group consisting of a model of a viral capsid and a model of a closed hull particle.

According to still further features in the described preferred embodiments, the viral capsid has an icosahedral morphology.

According to still further features in the described preferred embodiments, the closed hull particle has a morphology selected from the group consisting of tetrahedral morphology, icosahedral morphology, cubical morphology, octahedral morphology and dodecahedral morphology.

According to still further features in the described preferred embodiments, each of the structurally symmetric units has a 5-fold rotational symmetry.

According to still further features in the described preferred embodiments, each of the structurally symmetric units has a rotational symmetry selected from the group of 3-fold rotational symmetry, 4-fold rotational symmetry and 5-fold rotational symmetry.

According to still further features in preferred embodiments of the invention, the structurally symmetric units are structurally identical to one another.

According to still further features in preferred embodiments of the invention, the position and direction of the attachment entities in each of the basic components is identical.

According to still further features in preferred embodiments of the invention, the structurally symmetric units comprise at least two different types of basic components.

According to still further features in preferred embodiments of the invention, the direction of the attachment entities in one type of the basic components is reversed with respect a direction of the attachment entities in another type of the basic components.

According to still further features in preferred embodiments of the invention, each of the structurally symmetric units has a 5-fold rotational symmetry and the direction of the attachment entities in one type of the basic components is reversed with respect a direction of the attachment entities in another type of the basic components.

According to still further features in preferred embodiments of the invention, the structurally symmetric units comprise two different types of basic components.

According to another aspect of the present invention there is provided a method of modeling a self-assembly process of a closed and self-assembled multimer structure, the method includes:

(a) providing a plurality of structurally symmetric units that form the self-assembled multimer structure, each of the structurally symmetric units having a plurality of at least one type of basic components, the basic components comprise at least one type of attachment entity being positioned in or on a portion thereof, the units having structural complementarity to one another so as to form the closed and self-assembled multimer structure upon inducing proximity and orientation of the attachment entities;

(b) encouraging the plurality of the units to physically interact therebetween via the attachment entities; and (c) determining if a self-assembled multimer structure is created, whereby creation of a closed and self-assembled multimer structure is indicative for the self-assembly process.

According to further features in preferred embodiments of the invention, the modeling of a self-assembly process is capable of predicting a structure of the closed and self-assembled multimer structure and predicting an effect of a structural change in at least of the structurally symmetric units or at least one of the basic components or a change in at least one of the attachment entity.

According to yet another aspect of the present invention there is provided a kit for creating a physical model of a closed and self-assembled multimer structure, the kit includes several structurally symmetric units that form the self-assembled multimer structure, each of the structurally symmetric units having several types of basic components, the basic components comprise at least one type of attachment entity being positioned in or on a portion thereof, the structurally symmetric units having structural complementarity to one another so as to form the closed and self-assembled multimer structure upon inducing proximity and orientation of the attachment entities, such that by encouraging the plurality of the units to physically interact therebetween via the attachment entities, the closed and self-assembled multimer structure is formed.

According to features in preferred embodiments of the invention, the kit further includes a container for holding the structurally symmetric units that form the self-assembled multimer structure.

According to still another aspect of the present invention there is provided a closed and self-assembled multimer model structure, comprising several structurally symmetric units that form the self-assembled multimer structure, each of the units having several types of basic components, the basic components comprise at least one type of attachment entity being positioned in or on a portion thereof, the units having structural complementarity to one another so as to form the closed and self-assembled multimer structure upon inducing proximity and orientation of the attachment entities.

According to features in preferred embodiments of the invention, the closed and self-assembled multimer model structure is a physical model of a closed and self-assembled chemical multimer structure.

According to still further features in preferred embodiments of the invention, the structurally symmetric units are atomic model units of structurally symmetric chemical monomers that form the self-assembled chemical multimer structure.

According to still further features in preferred embodiments of the invention, the attachment entities are for modeling chemical affinity moieties of the chemical monomers.

According to still another aspect of the present invention there is provided a method of creating a structurally symmetric unit that form a closed and self-assembled multimer model structure, the method includes forming the unit and positioning least one type of attachment entity in or on the unit; whereas the structurally symmetric unit having structural complementarity to identical or different structurally symmetric units, so as to form the closed and self-assembled multimer structure upon inducing proximity and orientation of the attachment entities.

According to features in preferred embodiments of the invention, the formation the unit is selected from the group consisting of 3D printing, molding, casting and sculpturing.

According to still another aspect of the present invention there is provided a structurally symmetric unit that can be used in forming a closed and self-assembled multimer model structure, the structurally symmetric unit comprising at least one type of attachment entity being positioned in or on the structurally symmetric unit, the structurally symmetric unit having structural complementarity to identical or different structurally symmetric units, so as to form the closed and self-assembled multimer model structure upon inducing proximity and orientation of the attachment entities.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

As used herein, the singular form "a", "an" and "the" include plural references unless the context clearly dictates otherwise. For example, the term "a protein" or "at least one protein" may include a plurality of proteins, including mixtures thereof.

As used herein the term "about" refers to ±10%.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein throughout, the term "comprising" means that other steps and ingredients that do not affect the final result can be added. This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

The term "method" or "process" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3A shows an individual pentagonal tile (1) with magnets (2) showing opposite polarities (N and S) on their outward faces, which are inserted into cylindrical holes (3) on each face of the pentagonal tile showing the 5-fold symmetry axis of the tile (4). All edges between the top and bottom pentagonal faces of the tile are constructed such that extending the edge line inward it will pass through the center of the completely assembled dodecahedral container. FIG. 3B shows two pentagonal tiles (1) aligning to one another along one edge, so that the magnets have complementary faces aligning. FIG. 3C shows six such pentagonal tiles assembled into half a dodecahedral container, with all magnets paired except for those on the exposed open edge of five of the tiles. FIG. 3D shows the last step in the assembly of the dodecahedral container, wherein one (1) pentagonal tile (1) aligns with an assembly of eleven pentagonal tiles (2) such that the magnets on each have complementary faces aligned, causing its attachment.

FIG. 4A shows an individual 3-fold symmetric triangular tile (1) sighting down the three fold axis, with magnets (2) on one edge face aligned with the cylindrical holes (3) in that edge face of the tile, but not yet inserted, and magnets (4) on the other two edge faces inserted into the cylindrical holes in the tile. FIG. 4b shows two triangular tiles (1) adjoined through aligned complementary magnet interactions, to form two faces of the assembled tetrahedral container. FIG. 4c shows the last step in the assembly of the tetrahedral container, wherein one triangular tile (1) aligns with an assembly of three triangular tiles (2) such that the magnets on each have complementary faces aligned, causing its attachment.

DESCRIPTION OF THE PREFERRED EMBODIMENTS

Figure 1:
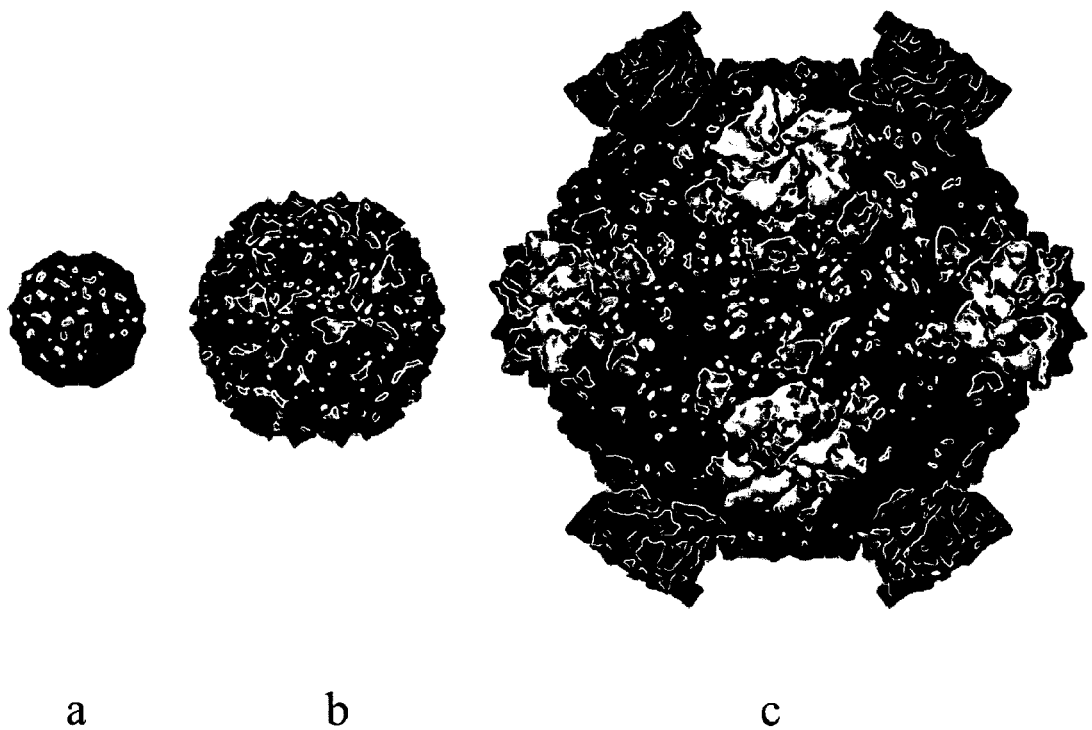
FIGS. 1a-c present a computer-generated illustration of the three dimensional structure of an icosahedral viral capsid of Satellite Tobacco Mosaic Virus (PDB entry 1a34, FIG. 1a), an icosahedral viral capsid of Polio Virus Type 3 (Sabin Strain, PDB: 1pvc, FIG. 1b), and an icosahedral viral capsid of Reovirus core (PDB: 1ej6, FIG. 1c), showing how evolution creates closed hull particles from proteins which can range in size from 200 Å to 2000 Å (the three structure illustrations are drawn on the same scale)

The present invention is of multimeric physical models which are capable of self-assembling into closed polyhedral structures. More specifically, the present invention is of closed self-assembled multimeric models which are made of structurally symmetric units, each having a basic asymmetric component that is characterized by an attachment entity for attachment to the other basic components of the model. In some embodiments of the present invention, the polyhedral models mimic the structure and self-assembly characteristics of naturally occurring viral capsids, and further offer a mean to investigate stochastic assembly processes which take place in microscopic molecular scale, such as viral capsids assembly as well as other chemical systems. The present invention is further of methods of creating structurally symmetric units which can be used in, for example, parts in a kit for forming multimeric physical models therefrom, and further of methods of forming the same.

The principles and operation of the present invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

As discussed hereinabove, one of the more intriguing phenomena in nature is the self-assembly of viral capsids, which constitute some of the more efficiently ordered and highly symmetric structures in the natural world, from fundamentally asymmetric, and currently still considered rather inconsistent, incoherent and illogical structures nature can offer, namely proteins. The structural study of viral capsids was forwardly pushed by the elucidation of the first three dimensional structure of the tomato bushy stunt virus by X-ray diffraction at atomic resolution at 1976-7 [Winkler, F. K., Schutt, C. E., Harrison, S. C. and Bricogne G., Nature, 1977, 265, 509-513; and Harrison, S. C., Olson, A. J., Schutt, C. E., Winkler, F. K. and Bricogne G., Nature, 23 Nov. 1978, 276, 368-373]. In this seminal work it was reported that the coat of the tomato bushy stunt virus is built from protein subunits having rigid domains connected by a flexible hinge, and that two states of the hinge are present in the T=3 icosahedral structure. As the field of viral structural studies by X-ray crystallography developed, more and more capsids structures were elucidated, leading to some of the most enlightening discoveries of modern science, particularly in the field of protein structures.

One of the most needed tools of the trade of X-ray crystallography is a 3-dimensional model of the structure under study. This tool is required not only for the realization of the convoluted numeric results of the X-ray diffraction experiment (atomic coordinates), or for the illustration thereof, but also for more in-depth studies of chemical and biologic aspects of the subject under study. With the advancement in computer graphics, most of this requirement is met by computer-generated imagery in two and three dimensions. Yet, for the demonstration of particular cases and features thereof, there is no substitute for a physical model which can be handled and observed manually.

However, the construction of physical models for biologic entities, particularly molecular entities is no trivial matter. To meet that end several new and innovative groups took upon this endeavor and successfully translated numeric structural data into physical models which are as accurate as the experimental crystallographic result. Solid freeform fabrication methods are covered by several technological approaches known as 3D printing, fused deposition modeling (FDM), stereolithography and rapid prototyping. More information regarding some examples of these techniques can be found in, for example, http://www.efunda.com/processes/rapid_prototyping/lom.cfm which presents the laminated object manufacturing (LOM) process, and http://intl.stratasys.com/ which is the official source of FDM prototyping.

One of the features of viral capsids, which are still not practically realized by computer-generated graphics, is the stochastic process of self-assembly of coat proteins into the intact capsids. In practice, the prediction, let alone the visualization of much simpler chemical events, is still not in reach of contemporary computing machines.

Hence, while conceiving the present invention, it was envisioned that use of physical models, such as those produced from atomic coordinates by one of the abovementioned LOM or FDM techniques, can be used to demonstrate and further study the stochastic process of viral capsids self-assembly as true to reality as possible. It was further envisioned that physical models will not only model known stochastic self-assembly processes, but may also be used to predict unprecedented processes of modified viral components and other chemical objects which are further removed from the naturally occurring cases of viral capsids self-assembly.

While further conceiving the present invention, the present inventors have devised several rules and tools to enable the construction of physical models based on an icosahedral capsids such as human rhinovirus, porcine parvovirus, rice yellow mottle virus, cricket paralysis virus and bacteriophage, all of which are based on 60 asymmetric units, arranged in 12 symmetric units, each having a pentagonal symmetry.

While reducing the present invention to practice the present inventors have produced, by means of FDM technology, several symmetric pentagonal concave units, and fitted bipolar magnets on their edges so as to mimic the attractive and binding forces between the coat proteins. While further reducing the present invention to practice, the present inventors have successfully produced a model of a viral capsids by a stochastic self-assembly process, by placing twelve copies of such units in a container and shaking the container by hand, so as to mimic the thermal motion of molecules in solution, until a closed multimer was formed inside the container.

These findings can be readily extrapolated to models of other self-assembled multimer structures by utilizing suitable structurally symmetric units for forming these structures. Such models can be utilized to construct a variety of articles, starting from toys and educational games and all the way through sophisticated systems, as detailed hereinbelow. Further, by using this methodology, prediction of the feasibility of various stochastic self-assembly processes can be performed, as detailed hereinbelow.

Hence, according to one aspect of the present invention, there is provided a method of creating a closed and self-assembled multimer model structure, which is effected by:

(a) providing several structurally symmetric units that form the self-assembled multimer structure; and (b) encouraging this ensemble of units to physically interact therebetween, thereby creating the closed and self-assembled multimer structure.

Correspondingly, according to another aspect of the present invention, there is provided a closed and self-assembled multimer model structure.

As used herein, the phrase "self-assembled" and its related noun "self-assembly", refers to a fundamental principle which may start from seemingly chaotic or random states and generates structural organization on all scales from molecules to large objects and systems, under stochastic conditions. In the context of the present invention, self-assembly is defined as a reversible process in which pre-existing and disordered components of a pre-defined system come together to form structures having a pre-defined order. Examples of self-assembly include, without limitation, the formation of nano-scale to millimeter-scale layered structures lying in the interface between two liquids, the formation of a viral capsid from individual specific capsomeres, and the formation of 2- and 3-dimensional lattices such as in crystals.

The term "closed" as used herein, refers to a morphological state of an object which has discrete inner and outer surfaces which are substantially disconnected, wherein the inner surface constitutes the boundary of the enclosed area or space, which is secluded from the exterior area of space which is bounded only by the outer surface. As used herein, the term "closed" can be used to describe a three-dimensional assembly of theoretical points which can be linked by theoretical linear lines so as to form a theoretical closed body homomorphic to a sphere. Thus, in the context of the present embodiments, the term closed does not necessarily mean obturation. Exemplary closed objects include, without limitations, an intact egg-shell, an intact and preferably inflated tire tube, a soap bubble and a wire-frame model of any three-dimensional body.

The term "model" as used herein describes an abstract physical representation of a system or an object that has dimensions in a scale that ranges from microns to centimeters. In the context of the present invention, this term does not encompass chemical compounds, small molecules and any other molecular structures.

The term "multimer" as used herein refers to an object which consists of a finite number of units, also referred to as monomers.

The term "symmetric" as used herein refers to an object having subunits (constituents, herein "basic components") that correspond to one another, relative to the whole object, via a symmetry operation or transformation; one subunit in a symmetric object is also referred to herein as "basic component". The term "basic component", as used herein, corresponds to the term "asymmetric unit" in a regular and perfectly symmetric object which constitutes the smallest unit that is being duplicated by all symmetry operations so as to form the whole object. According to embodiments of the present invention, the self-assembled multimer model structure may have the morphology of a regular and perfectly symmetric polyhedron, but may possess degenerate (lower) symmetry compared to that of the regular and perfectly symmetric polyhedron. This lowered symmetry is due to the basic component, which may have features which break the higher true symmetry of the regular and perfectly symmetric polyhedron. Hence, in order distinguish cases of real symmetry from cases of apparent symmetry and/or pseudo symmetry, the term "icosahedral morphology" is used herein to describe a multimer model structure which mimics objects that have true icosahedral symmetry.

The term "symmetry" as used herein refers to an exact correspondence of form and constituent (subunit) configuration about a center or an axis (rotation symmetry operation), on opposite sides of a point (inversion symmetry operation) or opposite sides of a dividing line or plane (reflection symmetry operation). In the context of the present invention, the term "symmetry" refers to point symmetry groups, which include rotations, reflections (point and plane inversions) and combinations thereof, and preferably does not encompass infinite lattice groups, which also include axis and plane translations and glide reflections.

The phrase "symmetry operation" or "symmetry transformation" as used herein include: a rotation operation about an axis, a reflection operation through a plane and an inversion operation through a point. Preferably the present invention is directed at chemical entities; therefore the symmetry operation is a rotation operation about an axis which, unlike the reflection and inversion, does not invert the chirality of chemical entity.

Thus, the phrase "structurally symmetric unit", as used herein, describes a single member of a group of sub-units of a multimeric structure, which exhibits the necessary symmetry and capacity for inter-unit interaction which are pre-requisites for the formation of the multimeric structure from a plurality thereof. For example, viral coat proteins, called capsomeres, are capable of forming the units, which are structurally symmetric units of the capsid which forms therefrom.

In the context of the present invention and according to preferred embodiments of the present invention, the structurally symmetric unit, or at least the structural core thereof, is made of a substantially rigid or elastic material with can preserve its form under relatively low to moderate physical force (relative to the mass of the unit) such as pressure resulting from physical contact with other units or other objects.

The self-assembly process described herein is made possible by virtue of several fundamental features of the structurally symmetric units which are presented hereinbelow.

Each of the structurally symmetric units can be represented by a polygon ideogram or three-dimensional polygonal structure (e.g., a concave pentagonal structure), namely each unit possesses n-fold rotational symmetry with respect to its overall structure. In practice, each structurally symmetric unit has a number of basic components, also referred to herein as asymmetric units, the number of which is equal to the order of symmetry "n" of the symmetric unit.

The asymmetric units of a polygon can be represented by a set of ideograms in the form of adjacent isosceles triangles which are arranged around a point which represents the center of rotational symmetry of the symmetric unit. Each triangle, which is at least isosceles if not equilateral, shares its isosceles sides with its immediate neighbors while the other side is one side of the polygon, and all triangles share the vertex opposite that side. For example, a square is a symmetric unit of 4-fold symmetry having four isosceles triangular asymmetric units, and a pentagon is a symmetric unit of 5-fold symmetry having five icosceles triangular asymmetric units.

The symmetric units need not be a true polygon nor flat, and neither have a straight plain edge; however, another structural requirement of the symmetric units is to be structurally complementary, or possess structural complementarity to one another so as to possess the capacity to form a closed and self-assembled multimer model structure.

The phrase "structural complementarity" refers to a three-dimensional structural feature of the accessible surface of a given physical entity, such as a solid or quasi-solid object, an assembly of such objects, and a chemical compound or an assembly of such compounds, or a physical three-dimensional model thereof. In the context of a chemical compound (or a physical three-dimensional model thereof), a non-limiting example of a chemical compound is a protein, for which the accessible surface expresses itself with respect to the three-dimensional structure of the accessible surface of other chemical entities, such as other proteins, small molecules, nucleic acids and the likes or a physical three-dimensional model thereof, which interact with the given chemical entity by coming in contact therewith via their accessible surfaces; such surface-to-surface interactions constitute the basis for biological function of biomolecules.

In the context of the natural and molecular world, structural complementarity forms the fundamental means to molecular recognition that allows the structure of one molecule to interact with another like matching pieces in a puzzle, like splines and their corresponding grooves in a machine, or like a lock and its corresponding key. Proteins in general, by virtue of their architectural diversity, and viral coat proteins in particular, are ideal for such structural complementary interactions.

In order for the structurally symmetric units to self-assemble, each of the basic components, or asymmetric units, comprises at least one type of an attachment entity which is positioned within or on a portion thereof. Thus, the resulting object is an n-fold structurally symmetric unit having n basic components, each having at least one type of an attachment entity.

The phrase "attachment entity", as used herein, refers to an entity which form a part of an object such as, and which give the object the ability to attach itself to another object. In the context of the present invention, the object is a structurally symmetric unit, and preferably, according to embodiment of the present invention, an attachment entity can attached to another, preferably compatible and more preferably complementing attachment entity which is found on another structurally symmetric unit.

The self-assembly process occurs when the attachment entities on the symmetric units are in sufficient proximity and are oriented so as to allow constructive encounters therebetween, namely an encounter that leads to an interaction between attachment entities of at least two symmetric units and the attachment thereof to one another.

In the context of the present invention the level of proximity depends on the attractive forces that can be exerted by the attachment entities. By "attractive force" it is meant physical forces that span and have an effect over a distance, or field, such an electric and magnetic fields. Thus, for example, if the attachment entities do not exert an attractive force field which extends beyond the physical boundary of the symmetric unit, the units must come in contact and touch in order to interact and be joined together. By "interact" it is meant that one or more units, each having attachment entities thereon, while being set in motion by means discussed hereinbelow, can come close enough and at a certain angle range so as to allow the attachment entities to attach to one another.

Otherwise, attachment entities which can exert an attractive force field may attract each other over a definable distance. The term "proximity" as used herein therefore describes any distance that allows interaction between the attachment entities, whereby this distance can be practically zero and depends on the type and extent of the attractive forces exerted by the attachment entities.

A pair of attachment entities on two symmetric units should also be oriented appropriately so as to allow a constructive encounter therebetween. This is particularly important in cases where the attachment entities are characterized by radial asymmetry, directivity, polarity, dipole, vectorial force, effective angle and/or other directional and spatial characteristics. An appropriate orientation is determined by steric constraints, surface accessibility and other structural complementarity considerations as described hereinabove. The term "orientation" therefore refers to a steric location and directionality of an object with reference to another object (herein the attachment entities).

The attachment entities are preferably directional or polar. The terms "directional" and "polar", as used herein, refer to a characteristic of the interaction formed between two complementary attachment entities, which can be defined as a vector having both a magnitude and a direction.

Exemplary directional attachment entities include, without limitation, magnetic entities such as ferromagnetic metal objects and the likes, which are characterized by two opposite poles constituting a polar attractive force which spans a magnetic attraction field. Similarly, electromagnetic entities and static charge entities constitute additional examples of attachment entities. As discussed hereinabove, such directional attachment entities exert attractive forces in an asymmetric radial space.

Additional examples include mechanical attachment entities which interact via a physical contact therebetween and are hence not characterized by an attractive field. Exemplary directional attachment entities in this context include, without limitation, hook-and-loop entities which can form a linkage only between a loop and a hook but not between two hooks/loops, thereby are definable as directional, and spline-and-groove entities which is directional from the same reason the hook-and-loop entities are directional.

According to a preferred embodiment of the present invention, the attachment entities are solid magnets such as those made of ferromagnetic metals as iron, cobalt, nickel, gadolinium and alloys thereof.

Inducing the appropriate proximity and orientation for the joining of two attachment entities is effected by encouraging the symmetric units to physically interact therebetween, thereby creating the closed and self-assembled multimer model structure.

As used herein, the term "encouraging" refers to setting the symmetric units in motion, and preferably random motion in a closed spatial enclosure, such that there relative orientation between two given units rapidly varies such that a multitude of relative orientations is sampled over a relatively short period of time, preferably in the order of minutes or hours. In the context of the present invention, this encouraging is effected by applying an external force.

Encouraging the units to interact can be effected by, for example, applying kinetic energy to the structurally symmetric units. The kinetic energy can be applied by, for example, shaking the units together in a closed or open container; agitating the units together so as to allow the units to take any random relative proximity and orientation; afloating the units in a fluid media such as a liquid or gas; or otherwise mixing, tossing, tumbling and colliding the units until they self-assemble and form the closed and self-assembled multimer model structure.

According to a preferred embodiment of the present invention, the symmetric units are encouraged so as to reach a suitable proximity and orientation by manual or mechanical shaking of an appropriate number thereof in a closed container.

Thus, using the methodology described herein, various closed and self-assembled multimer model structures can be readily obtained by appropriately designing suitable structurally symmetric units according to the guidelines described hereinabove. As further discussed hereinbelow, such self-assembled multimer model structures are provided in other aspects of the present invention.

The closed and self-assembled multimer model structure may model naturally occurring structures, similar in shape and unit division, distribution and internal fragmentation, but of different scale (dimension), unit substance-composition and attachment entities.

Preferably, the structure presented herein is a physical model of a closed and self-assembled multimer chemical structure, whereas the structurally symmetric units are atomic model units of structurally symmetric chemical monomers that form the self-assembled chemical multimer structure. Accordingly, the attachment entities on the structurally symmetric units model chemical affinity moieties of the structurally symmetric chemical monomers. The physical models presented herein can therefore mimic many aspects of the naturally occurring and/or synthetic structure and preserve several key structural and other principal features thereof such as the ability to self-assemble by stochastic processes, while having a relatively size (macro-scale) and simple and stable composition, such as wood, plastic, paper, metal, mineral and combination thereof, which are easier to see, hold and handle by humans without the use of imaging, magnification and other technologies merely by being large and technically and mechanically simple.

The closed and self-assembled multimer model structure may model naturally occurring or synthetic closed hull micro- or nano-sized particles, some of which are presented hereinbelow and in a United States Provisional Patent Application entitled "Self-assembled Polyhedral Multimeric Chemical Structures", by the present inventor, filed Mar. 13, 2007, Ser. No. 60/906,899, which is incorporated in its entirety as if fully set forth herein. Unlike these molecular-scale structures they mimic, the physical model structures of the present embodiments are macro-scaled and substantially robust.

Figure 3:
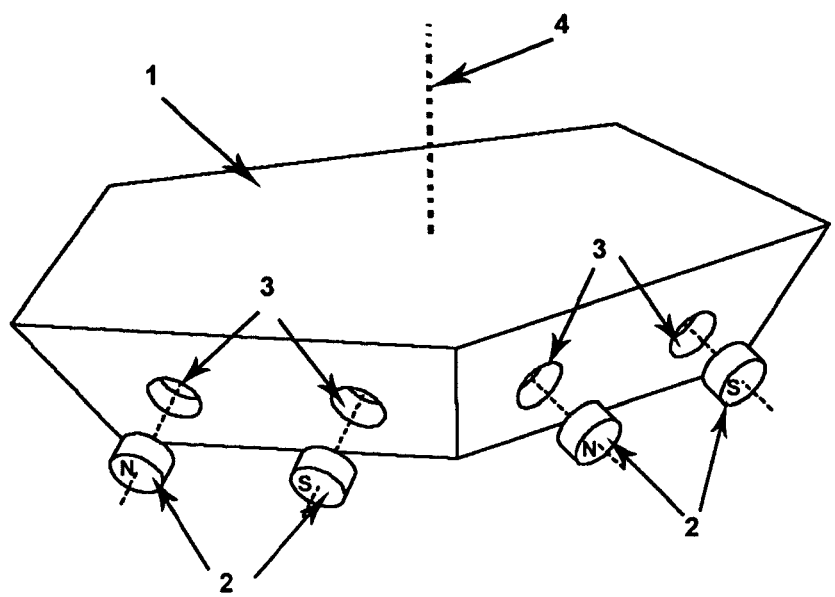
FIGS. 3a-d present the components and assembly of simple tapered five-fold symmetric pentagonal tiles of thickness t into an intact dodecahedral container, wherein twelve identical pentagonal tiles attach by means of two (2) cylindrical magnets imbedded on each of the five sides of each tile, to form aligned complementary magnetic interactions between tiles.
Figure 3:
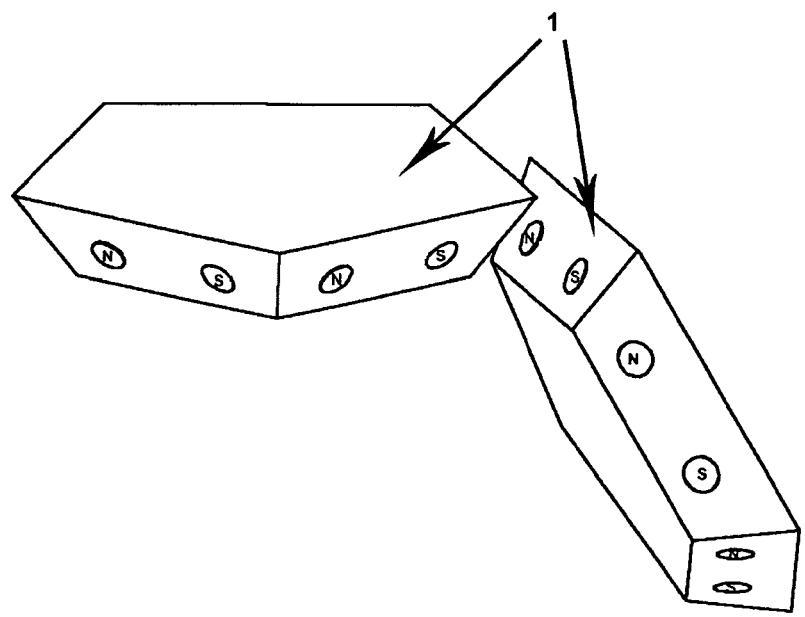
Figure 3:
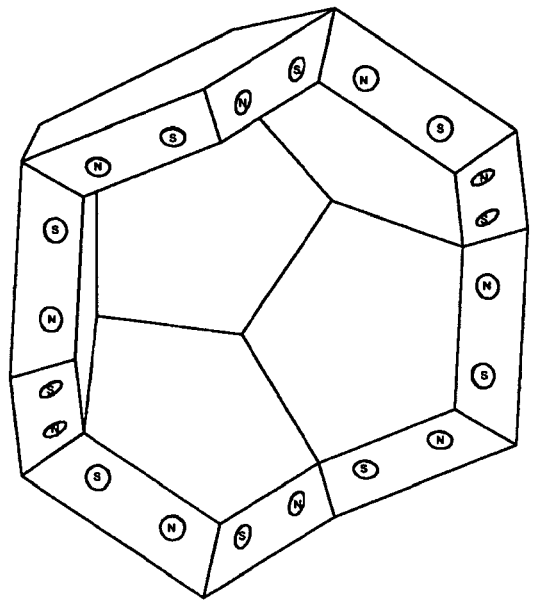
Figure 3:
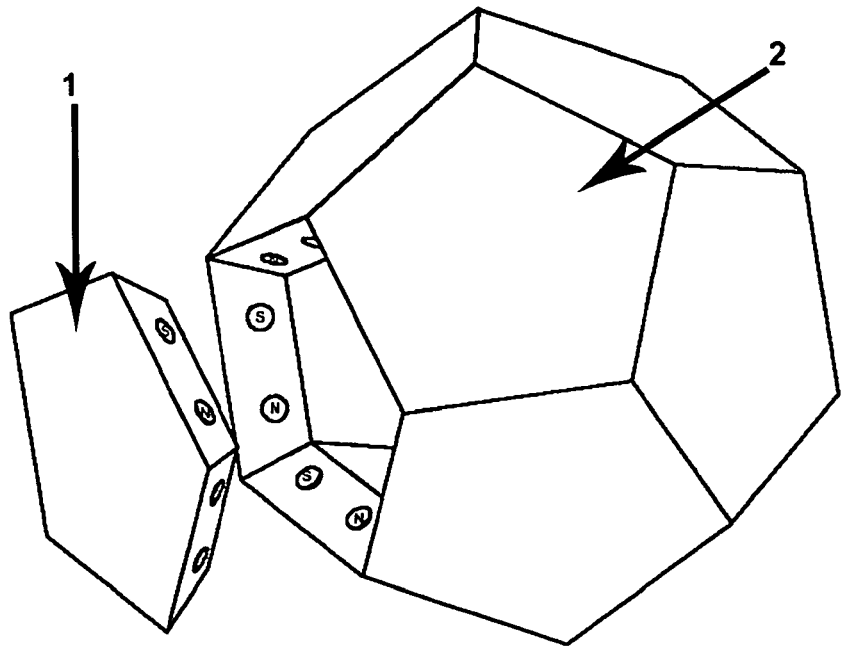
Figure 4:
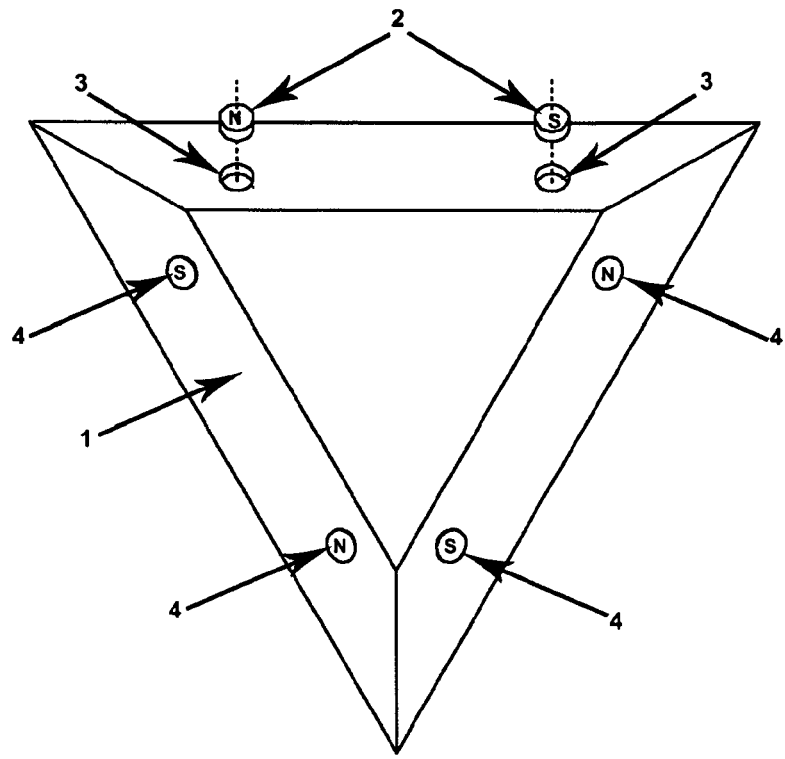
FIGS. 4a-c present the components and assembly of simple three-fold symmetric triangular tiles of thickness t into an intact tetrahedral container, wherein four identical triangular tiles attach by means two (2) cylindrical magnets imbedded on each of the three sides of each tile, to form aligned complementary magnetic interactions between tiles.
Figure 4:
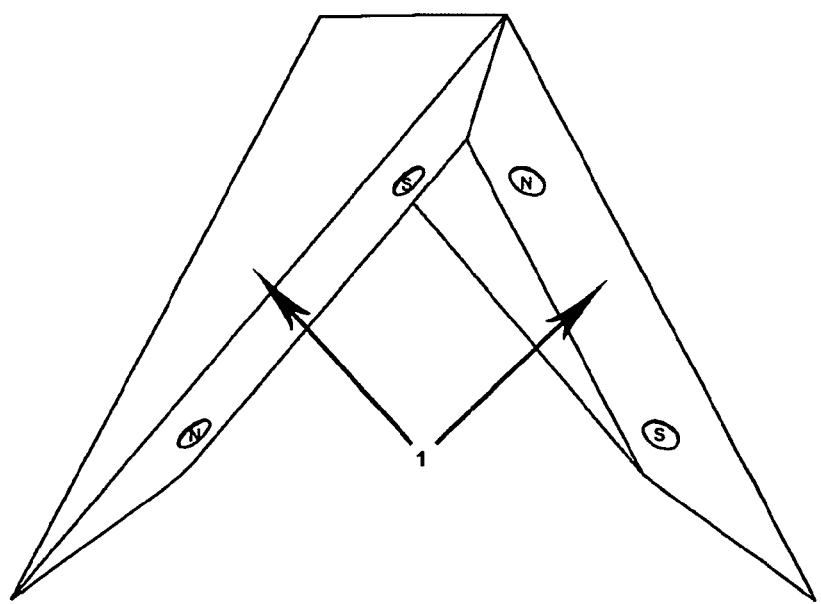
Figure 4:
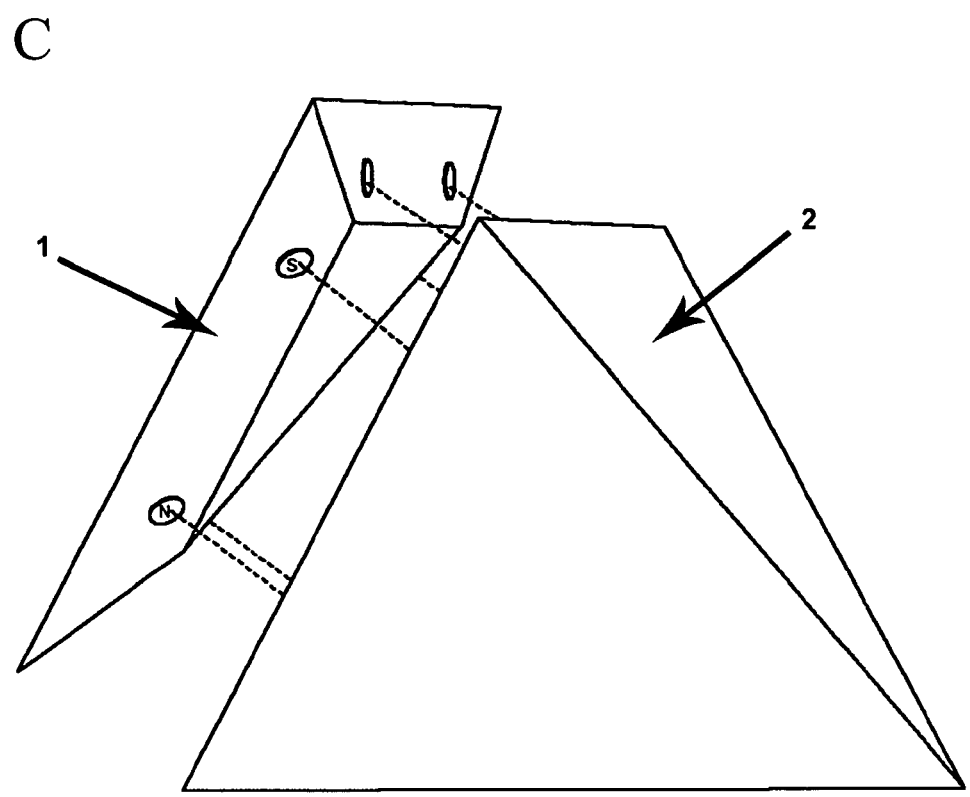

The closed and self-assembled multimer model structure models of the present invention, like the closed hull particles that they model, can take a wide range of morphologies such as, for example, tetrahedral morphology (see FIG. 4, for example), icosahedral morphology, cubical morphology, octahedral morphology and dodecahedral (see FIG. 3, for example) morphology.

Symmetric polyhedral morphologies are present in several classes of closed and highly symmetric solids which include, without limitation, platonic solids, Catalan solids, Archimedean solids, Kepler-Poinsot solids and the likes. When modeling closed hull particles having a variety of polyhedral morphologies, each of the structurally symmetric units of the closed and self-assembled multimer model structure possesses a rotational symmetry of 3-fold rotational symmetry, 4-fold rotational symmetry and/or 5-fold rotational symmetry.

Platonic solids, named after Plato, are three dimensional geometric polyhedral structures wherein all faces are identical regular polygons and all angles are equal. This unique class of closed structures include only five such polyhedrons. The cube is the most common and simple platonic solid constructed from squares and the dodecahedron from regular pentagons. Tetrahedrons having 4 faces, octahedrons having 8 faces and icosahedrons having 20 faces, are all constructed from equilateral triangles.

Archimedean solids, named after Archimedes and also known as semi-regular solids, constitute another class of closed three dimensional geometric polyhedral structures. This class of 13 possible solids is characterized by having faces which are all regular polygons, though not necessarily all of the same type, and wherein all polyhedral angles are equal. These solids are less common and intuitive than the platonic solids, and include the truncated tetrahedron, the cuboctahedron, the truncated cube or truncated hexahedron, the truncated octahedron, the rhombicuboctahedron or small rhombicuboctahedron, the truncated cuboctahedron or great rhombicuboctahedron, the snub cube or snub cuboctahedron appearing in two chiral forms, the icosidodecahedron, the truncated dodecahedron, the truncated icosahedron also known as the buckyball or football/soccer ball, the rhombicosidodecahedron or small rhombicosidodecahedron, the truncated icosidodecahedron or great rhombicosidodecahedron, and the snub dodecahedron or snub icosidodecahedron which also appears in two chiral forms.

Catalan solids are all convex and face-uniform but not vertex-uniform. Unlike Platonic solids and Archimedean solids, the faces of Catalan solids are not regular polygons, however, the vertex figures of Catalan solids are regular, and they have constant dihedral angles. This class of closed solids include the triakis tetrahedron, the rhombic dodecahedron, the triakis octahedron, the tetrakis hexahedron, the deltoidal icositetrahedron, the disdyakis dodecahedron, the or hexakis octahedron, the pentagonal icositetrahedron, the rhombic triacontahedron, the triakis icosahedron, the pentakis dodecahedron, the deltoidal hexecontahedron, the disdyakis triacontahedron, the or hexakis icosahedron, and the pentagonal hexecontahedron.

Kepler-Poinsot solids are regular non-convex polyhedrons, wherein all the faces are identical regular polygons and which has the same number of faces meeting at all their vertices as compare to platonic solids.

Some models of polyhedral closed multimer structures, such as, for example, those belonging to the Archimedean solids class and the Catalan solids class, are composed of structurally symmetric units which are structurally different and possess a different polygonal shape and internal rotational symmetry, while identical to one another models of polyhedral closed multimer structures, such as for example those belonging to the platonic solids class and the Kepler-Poinsot solids class, are composed of structurally symmetric units which are structurally identical to one another and possess the same polygonal shape and internal rotational symmetry.

The closed and self-assembled multimer model structure of the present invention can mimic viral capsids, which represent one of nature's most inspiring classes of closed and self-assembled chemical multimer structures, as discussed in details hereinabove. Thus, if viral capsids, which can be modeled by the closed and self-assembled multimer model structure presented herein, have icosahedral morphology and symmetry, then the model also exhibits an icosahedral morphology and symmetry. The icosahedral morphology has more degenerate representations such as the dodecahedron, and more evolved representations such as the pentakis dodecahedron.

In some preferred embodiments of the present invention, each of the structurally symmetric units, albeit one whole object, can be internally subdivided into five identical basic components, or asymmetric units, which are fused together around the axis of the five-fold symmetry. Twelve identical units such as these constitute a dodecahedron or a pentakis dodecahedron; hence, the symmetry of such a model may be as high as an icosahedral symmetry which is also characteristic to a pentakis dodecahedron, since dodecahedrons are duals of icosahedrons. When modeling viral capsids having a pentakis dodecahedron morphology and an icosahedral symmetry, each of the structurally symmetric units of the closed and self-assembled multimer model structure has a 5-fold rotational symmetry.

In order to maintain the similitude of the structurally symmetric units, also the direction and nature of all the attachment entities attached thereon must be identical in all the basic components of all the structurally symmetric units.

In some preferred embodiment of the present invention, the structurally symmetric units comprise at least two different types of basic components. Although the outline and shape of all types of basic components may be the same, different types of basic components may vary in the direction or nature of the attachment entity attached thereto. In these cases, the shape of the structurally symmetric units remains that of a regular pentagon, but the variability of the attachment entities breaks the 5-fold symmetry in terms of attachment capacity to other structurally symmetric units.

In some preferred embodiment of the present invention, two different types of basic components vary in the direction of the attachment entities in one type of basic component is reversed with respect a direction of the attachment entities in the other type of basic component.

Figure 5:
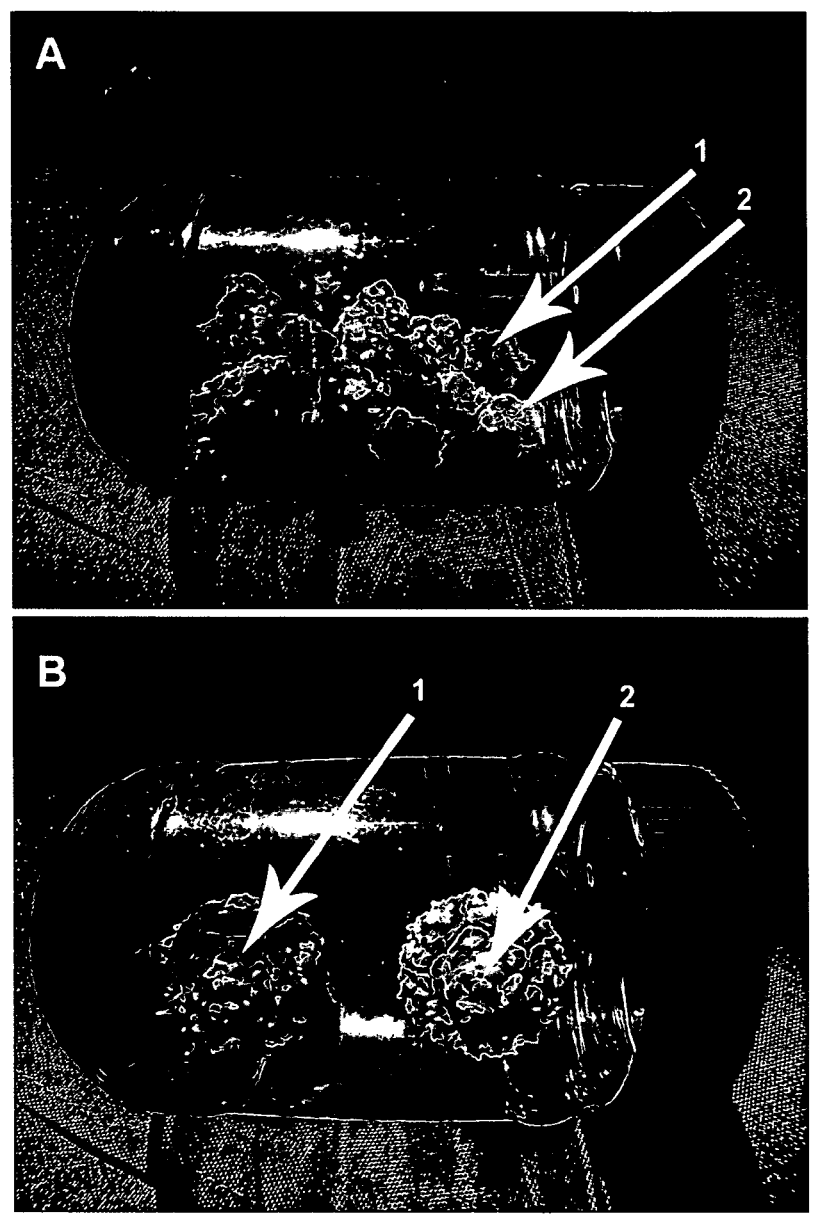
FIGS. 5a-b present two serial photographs taken during a simulation experiment of the stochastic self-assembly, wherein twelve identical copies of dark grey tiles (1) (physical model units of the pentameric poliovirus capsomere) and twelve identical light grey tiles (2) were placed in a 132 cm² plastic vial (FIG. 5a), which are chiral enantiomers with respect to one group to the other by virtue of reversing the polarity of the magnets along the tile's edges, and shaken vigorously by hand for about 10 minutes until two spheres, each containing only one color scheme (FIG. 5b), have self-resolved and assembled into two capsids each composed of only one type of colored (homochiral) tile.

As presented and demonstrated in the Examples section that follows, reversing the direction of the attachment entities in one type of basic component changes the capacity of the structurally symmetric units to self-assemble into a closed and self-assembled multimer model structure. As presented in Example 3 in the Examples section that follows, when two populations of structurally symmetric units which differ from one another only in the direction of the attachment entities thereof are mixed together at sufficient numbers, two discrete closed and self-assembled multimer model structures are formed therefrom, and each multimer model structure is composed of only one population of structurally symmetric units, as illustrated in FIG. 5.

The closed and self-assembled multimer model structure presented herein may also be composed of two or four different types of structurally symmetric units wherein some of the structurally symmetric units have two different types of basic components which differ from one another in the direction of attachment entities attached thereon.

Figure 6:
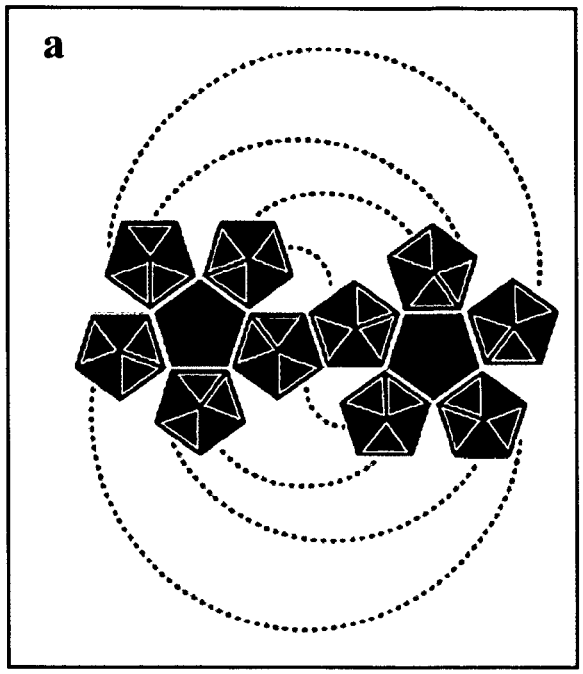
FIGS. 6a-c present a pentakis dodecahedron-shaped capsid system composed of two heterogeneous capsomere (tile) types having two inter-complimentary edge types, as a schematic illustration of the combinatorial scheme (FIG. 6a) wherein one edge type is marked in black which binds to the other edge type marked in grey, thus constituting the two tile types system which includes two copies of one tile type having 5 identical "black edges", and ten copies of the other tile type having two "black edges" and 3 "grey edges", wherein the dashed lines connect between a "black edge" and a "grey edge" which are in contact in the resulting pentakis dodecahedron, and in two photographs of the physical model thereof showing all twelve tiles of the disassembled capsid (FIG. 6b) and the resulting assembled capsid (FIG. 6c)
Figure 6:
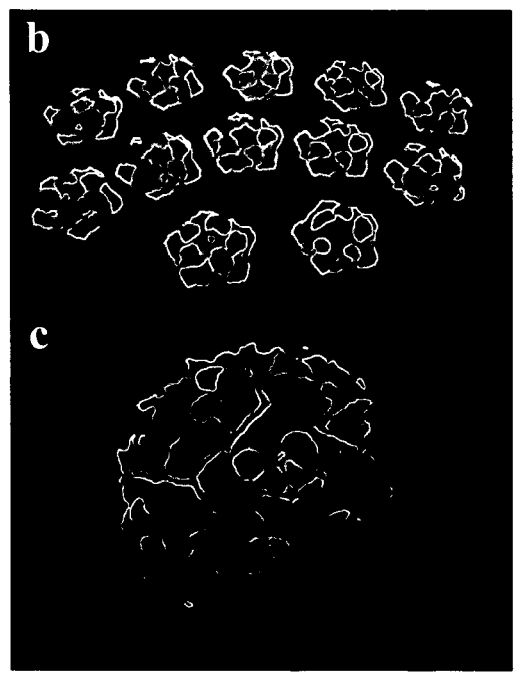

One such scheme of self-assembly is presented in Example 4 in the Examples section that follows, wherein a closed and self-assembled multimer model structure is constructed from two different types of structurally symmetric units. In this exemplary embodiment of the present invention, which is illustrated in FIG. 6, the overall morphology of the closed and self-assembled multimer model structure is of a pentakis dodecahedron, namely each structurally symmetric unit has an overall regular pentagonal shape, and each basic component in an isosceles triangle. The first type of structurally symmetric units has only one type of basic component, namely all the attachment entities therein have the same direction. The second type of structurally symmetric units has two types of basic components arranged so that two basic components having their attachment entities directed as in the first type of structurally symmetric units, are separated by basic components having their attachment entities reversed as compared to those of the first type of structurally symmetric units (see, FIG. 6).

Figure 7:
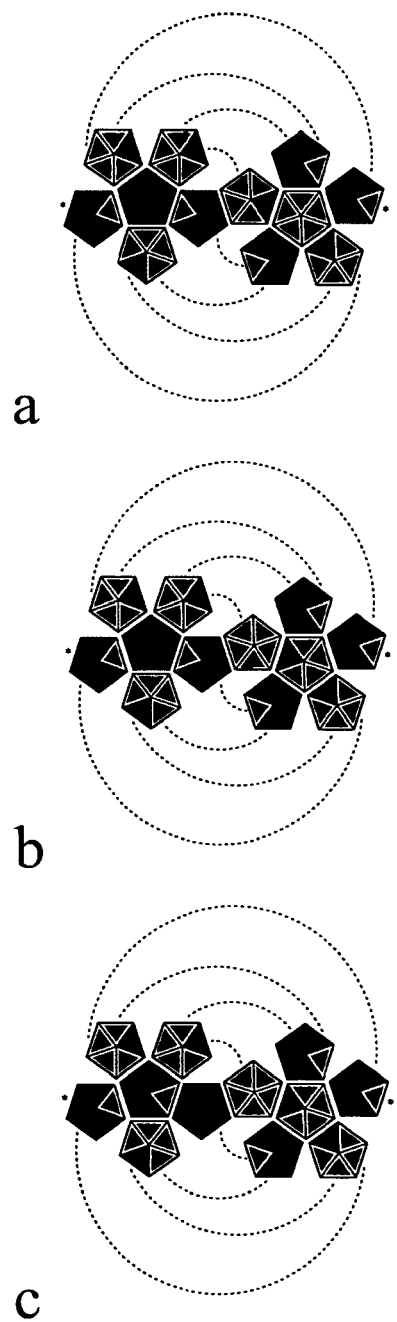
FIGS. 7a-c present a pentakis dodecahedron-shaped capsid system composed of four heterogeneous capsomere (tile) types having two inter-complimentary edge types, one marked in black and the other in grey, as schematic illustrations of three combinatorial schemes, each having one tile having 5 identical "black edges", one tile having 5 identical "grey edges", five tile having four "black edges" and one "grey edge", and 5 tiles having four "grey edges" and one "black edge", wherein the dashed lines connect between a "black edge" and a "grey edge" which are in contact in the resulting pentakis dodecahedron.

Three different schemes of self-assembly are presented in Example 5 in the Examples section that follows and illustrated in FIG. 7, wherein a closed and self-assembled multimer model structure is constructed from four different types of structurally symmetric units.

The capacity to model various schemes of self-assembly using physical large-scale models, as presented herein, opens the route to investigate the concept of self-assembly in microscale and atomic scale. To that end, the investigator may devise a putative scheme for a closed and self-assembled multimer model structure, implement this scheme in a physical model as presented herein, and put this putative scheme to the test of self-assembly, namely corroborate the assumption of self-assembly ascribed to that particular self-assembly scheme by the formation of a multimer model structure by a self-assembly process.

Hence, according to another aspect of the present invention, there is provided a method of modeling a self-assembly process of a closed and self-assembled multimer model structure which includes:

(a) providing a plurality of structurally symmetric units that form the closed and self-assembled multimer model structure, each of these units is having a plurality of one or more types of basic components which comprise one or more types of attachment entities being positioned in or on a portion thereof, and wherein these structurally symmetric units are having structural complementarity to one another so as to form the closed and self-assembled multimer model structure upon inducing proximity and orientation of said attachment entities;

(b) encouraging this plurality of structurally symmetric units to physically interact therebetween via the attachment entities; and (c) determining if a closed and self-assembled multimer model structure is created, whereby creation of a closed and self-assembled multimer model structure is indicative for the self-assembly process.

As discussed herein and demonstrated in the Examples section that follows, any alteration in the attachment entities in one or more structurally symmetric units greatly affects the self-assembly process. Therefore, the modeling of a self-assembly process is capable of predicting a structure of the closed and self-assembled multimer model structure, and further capable of predicting an effect of a structural change in one or more of the structurally symmetric units or in one or more of the basic components or a change in one or more of the attachment entities.

Implementing a putative self-assembly scheme in a physical model requires the fabrication of an assemblage of carefully designed elements and tools for conducting the self-assembly experiment. This assemblage should include a sufficient number of structurally symmetric units of one or more type, and a mean to encourage these units to physically interact therebetween and form the closed and self-assembled multimer model structure.

Hence, according to another aspect of the present invention there is provided a method of creating a structurally symmetric unit that form a closed and self-assembled multimer model structure, which includes forming the unit by any one of the techniques, known as 3D printing, molding, casting and sculpturing, as mentioned hereinabove; and positioning one or more types of attachment entities in or on the unit. As discussed hereinabove, the overall shape and outline of the structurally symmetric units should exhibit structural complementarity to identical or different structurally symmetric units in the multimer model structure, so as to form the closed and self-assembled multimer structure upon inducing proximity and orientation of the attachment entities.

Correspondingly, according to another aspect of the present invention, there is provided the structurally symmetric unit that can be used in forming a closed and self-assembled multimer model structure.

Once creating the main body of the structurally symmetric unit by one of the abovementioned techniques, the choice of any type of attachment entities and the positioning thereof in or on the structurally symmetric unit, will determine the nature of the structurally symmetric unit in terms of its capacity to form a stable linkup with other similar or different structurally symmetric units.

For example, using dipolar ferromagnetic magnets, which is one of the preferred embodiments of the present invention, requires identifying a suitable location in or on the basic component comprising the structurally symmetric unit, and identifying the direction of the poles of each magnet. The position of the magnets should be in the interface between two adjacent structurally symmetric units in the expected multimer model structure, namely in a location where these structurally symmetric units actually come in physical contact or come in sufficient proximity so as to allows the magnets on each one of the structurally symmetric unit to attract one another, provided their poles are directed appropriately.

Hence, according to another aspect of the present invention there is provided a kit for creating a physical model of a closed and self-assembled multimer model structure, the kit comprising a plurality of structurally symmetric units that form the closed and self-assembled multimer model structure, each of these structurally symmetric units is having a plurality of one or more types of basic components which comprise one or more type of attachment entity being positioned in or on a portion thereof, and wherein these structurally symmetric units are having structural complementarity to one another so as to form the closed and self-assembled multimer model structure upon inducing proximity and orientation of said attachment entities; such that by encouraging the units to physically interact therebetween via the attachment entities, the closed and self-assembled multimer model structure is formed.

According to embodiments of the present invention, a kit may contain structurally symmetric units of more than one self-assembled multimer model structure, so as to form more than one structure. For example, a set of 12 pentagonal structurally symmetric units can form one dodecahedral multimer model structure, as demonstrated in Example 2 in the examples section that follows hereinbelow, and 24 identical units can form two such structures. Further according to other embodiments, two sets of structurally symmetric units, each designed to form a distinct multimer model structure, can be comprise one kit, and form two distinct structures in one container. This concept is demonstrated practically in Example 3 in the examples section that follows hereinbelow, wherein a first set of units is having magnets attached thereto at a certain orientation with respect to their polarity, and a second set of units is having magnets attached thereto at a reversed orientation with respect to the magnets of the first set. In the exemplary kit presented in Example 3 hereinbelow, the two sets of units are colored differently for clarity, but the general concept allows the kits to comprise two or more sets of units that may look similar in shape and color, but when encouraged to interact therebetween, can form two or more distinct self-assembled multimer model structures.

As discussed hereinabove, the structurally symmetric units should be encouraged to interact physically therebetween, and this encouragement can be obtained, for example, by imparting kinetic energy to the structurally symmetric units. As further presented hereinabove, this imparting is preferably effected by shaking the structurally symmetric units together. In order to allow shaking, mixing and colliding the structurally symmetric units among themselves, the kit further includes a container for holding the structurally symmetric units. Such a container is required to be useable for encouraging an appropriate number of structurally symmetric units to physically interact therebetween via their attachment entities. In other words, the container should be sufficiently large and robust enough so as to allow vigorous shaking of a number of these units without breaking while allowing the units to assume a random set of relative orientations and motions. The size of the container should provide enough space for the units to tumble freely, but not too large so as not to lower the probability for any two units to collide.

The shape of the container, or the cross-section of its interior, should be sufficiently large so as to allow all fully assembled structure to fit in it the container, namely it should be wide enough in at least parts of its interior. Preferably the shape of the container is cylindrical or spherical.

The size of the container therefore depends of the number and size of the units and on the number and size of the fully assembled structures that can form in potential from these units. For example, the size of the container can be in the range of 105% to 1000% of the total volume of all the fully assembled structures that can be potentially formed therein.

The kits of self-assembled multimer structure models presented herein can be utilized, for example, as toys, decorative articles of manufacturing, educational games and tools, entertainment games, construction kits, random number generator, a tool for practical manifestation of probabilities equivalent to, for example, a dice with 9 quadrillion sides, scientific demonstration tool of, for example, self assembly, entropy versus enthalpy extrema (kinetic energy trap and local minima versus thermodynamic minimum), evolution of viruses and the likes.

Exemplary toys include, for example, a spherical container, 6 cm in diameter and made of 3 mm thick glass, having 12 identical pentagonal structurally symmetric units fitted with magnets sealed therein. The glass sphere, which can fit easily in an adult human hand, is first shaken strongly by hand once or twice to make sure there is no fully or partially assembled structure inside it, and then shaken more gently and continuously until a fully form structure self-assembles inside. This exemplary toy may be sealed, or have an opening wide enough for the individual tiles to fit through and into the container, but the assembled structure is stuck inside, much like in a "ship in a bottle" type of toy.

In other embodiments, a toy of self-assembly presented herein can be used to generate random assembly and unique patterns using differently colored or variable patterned tiles.

In another embodiment, the toy may be used to win treats, such as small candies, by placing suitably sized treats, small enough for several thereof to fit into a fully assembled structure, together with the tiles inside the assembly container, and letting the player shake the container until the structure is fully assembled. The player wins whatever has been captured inside the structure, like an "inverse Pinata".

Exemplary decorative articles of manufacturing include self assembly articles of various scales. On a small scale, according to embodiments of the present invention, the decorative article may be a wearable pendant or a locket having small tiles placed inside a glass sphere attached to a holding link and a chain. On a medium to large scale, the decorative article may be a decorative sculpture with an automatic or manual shaking mechanism having two levels of agitation, one strong level to disassemble the fully assembled structure and one weaker level to encourage the tiles to self-assemble. Such a sculpture may be used as a museum display or a house-hold decoration.

Educational games and tools can be utilized, for example, to demonstrate complex stochastic self-assembly processes of natural systems, such as viral capsids formation, which cannot be seen or demonstrated otherwise, as discussed herein.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Materials and Methods

Solid molecular models were prepared by the fused deposition manufacturing (FDM) process utilizing a Stratasys Dimension FDM machine and ABS plastic extrusion (stratasys.com), or by a "solid" printer process utilizing a Z-Corp 510 printer using gypsum powder and color binder at the Scripps Research Institute, San Diego, Calif., USA.

Disk shaped bipolar solid NdFeB magnets, having dimensions of 1/16 inch diameter and 1/32 inch thick were purchased from Forcefield (forcefieldmagnets.com).

Example 1

Basic Models of Capsomeres of a Poliovirus Capsid

In order to explore the generality of the phenomenon of stochastic assembly of viral capsids, and the applicability of the models and methods of the present invention relating thereto, modeling the self-assembly process of the capsid of the poliovirus was practiced. The capsid of the poliovirus comprises 12 pentameric capsomeres. Each of these pentameric structures is composed of 5 components, and each of these components comprises 4 individual protein chains, namely 20 viral coat proteins assemble into one well-shaped five-sided capsomere having structural features and electrostatic charges along its five edges which are complementary to the edges of identical capsomeres.

Figure 2:
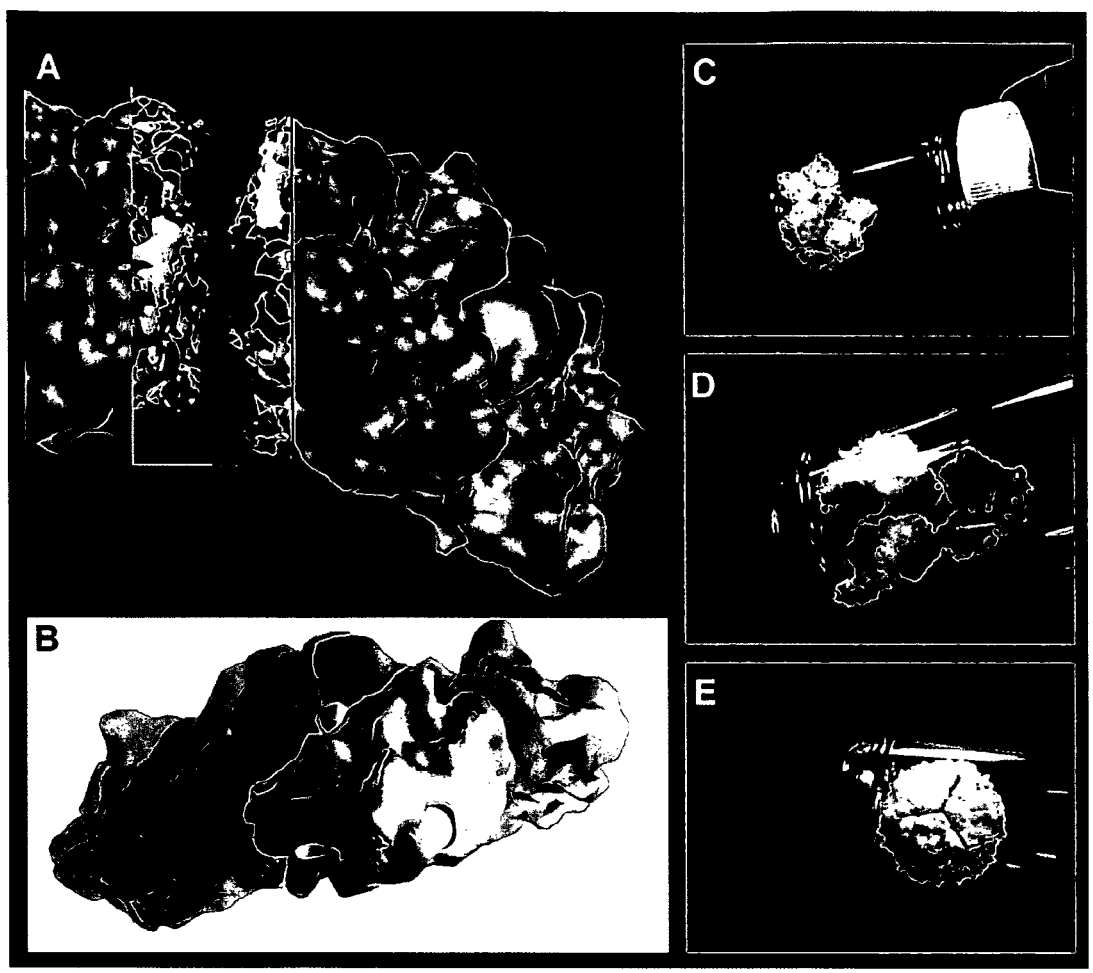
FIGS. 2a-e present basic model units of capsomeres of the Poliovirus capsid as a computer-generated illustration of the surface of two poliovirus pentameric capsomeres, wherein the positively charged portions of the capsomere-to-capsomere interaction interface area are marked in black and negatively charged portions thereof are marked in white, showing the complementarity between the two sides in the interface of two capsomeres (FIG. 2b), as a computer-generated illustration of one poliovirus pentameric capsomere, highlighting one subunit of the pentameric capsomere as opaque and the other four subunits as semi-transparent (FIG. 2b), and as three serial photographs taken during a stochastic self-assembly experiment effected by shaking 12 identical physical model units of the pentameric poliovirus capsomere in a glass vial, showing no assembly and no interaction between the model units prior to commencing the shaking (FIG. 2c), partially formed capsid intermediates (FIG. 2d), and a fully formed model of the poliovirus capsid self-assembled after 1-2 minutes of manual shaking (FIG. 2e)

Twelve identical copies of auto-fabricated physical model units of the aforementioned poliovirus capsomeres (the self-assembly units or tiles) were made using the FDM process at a scale of 1:1,250,000 molecule:model, namely the tile edge is 13 mm long. Each of the model units embodied all the key features of the natural poliovirus capsomere, namely all the basic model copies, or tiles, exhibited the five-fold symmetry and the appropriate curvature at the tile interfaces. Furthermore, the electrostatic interactions occurring between the natural capsomeres at their edges were mimicked by appropriate placement of magnets at the edges of the tiles, and appropriate polar orientation thereof, namely two magnets were placed on each tile edge oriented with opposite North/South polarity (N/S or S/N) facing out, such that each tile was fitted with ten magnets, thus retaining its five-fold symmetry which included the magnet orientation. The model structural features and these magnetic interactions between the tiles of the model analogize the geometric and electrostatic complementarity of the interfaces between natural capsomeres, as presented in FIG. 2.

FIG. 2a presents a computer generated illustration of the Connolly surface of two poliovirus pentameric capsomeres, according to which the FDM model were built. In practice a spherical harmonic approximation to the molecular surface was used so as to avoid interdigitating protrusions that would not allow the independent surfaces to mesh. In FIG. 2a, the positively charged portions of the capsomere-to-capsomere interaction interface area are marked in black and negatively charged portions thereof are marked in white, showing the complementarity between the two sides in the interface of two capsomeres. FIG. 2b presents a computer generated illustration of one poliovirus pentameric capsomere, highlighting one subunit in as opaque and the other four as semi-transparent.

Example 2

Self-Assembly of the Basic Models into a Capsid

Self-assembly of the basic capsomere models into a capsid, modeling that of a poliovirus, was effected by placing the 12 identical copies described in Example 1 hereinabove in a 90 cm$^3$ vial measuring 11 cm in length and 5 cm in diameter, capping the vial and applying manual shaking with appropriate force for 1-2 minutes. The shaking resulted in a stable closed shell representing the poliovirus capsid, as can be seen in FIGS. 2c-e.

FIGS. 2c-e present three serial photographs taken during a simulation experiment of the stochastic self-assembly, wherein 12 identical copies of the physical model units of the pentameric poliovirus capsomere were placed in a vial and shaken vigorously by hand for 1-2 minutes. FIG. 2c was taken prior to commencing the shaking, showing no interaction between the model units. FIG. 2d was taken in the middle of the shaking, showing partially formed capsid intermediates. FIG. 2d was taken after 1-2 minutes, at the end of the simulation experiment, showing a fully formed model of the poliovirus capsid.

The remarkable speed at which this assembly took place, given the number of interfaces that need to form, can be attributed to the symmetry of the tiles and the symmetry of the resulting capsid, and to the redundancy of the interfaces. This highly symmetric and over-redundant system exhibits self-complementary at five equivalent faces per tile, while only one configuration yields the most stable structure—the assembled capsid.

Another way to explain the rapid self-assembly is the number of combinations that a dodecahedron can be put together from 12 pentagonal tiles, which is $11! \times 5^{12} = 9.75E+15$. Hence, the degeneracy of the interactions allows a very large number of physical interactions to lead to productive interface formation for an intact capsid.

Schematics of the components of simpler polyhedral systems can be seen in FIGS. 3a-d, for dodecamer assembly, and FIGS. 4a-c for tetrahedral assembly.

Example 3

Chiral Models of Capsomeres and Self-Assembly of Homochiral Capsids

The following example was directed at investigating the self-assembly of capsid models from two populations of capsomere models mixed together. To this end two types of capsomere models were fabricated, using the same three-dimensional basic capsomere structure but having the magnet pairs in one population reversed with respect to the other population, hence forming two enantiomeric pentagon populations which are chiral (and incompatible) with respect to one another. One population was colored dark grey and the other was colored light grey, as can be seen in FIGS. 5a-b.

FIGS. 5a-b present two serial photographs taken during a simulation experiment of the stochastic self-assembly, wherein twelve identical copies of dark grey tiles (physical model units of the pentameric poliovirus capsomere) and twelve identical light grey tiles were placed in a 132 cm$^3$ vial (see, FIG. 5a), which are chiral enantiomers with respect to one group to the other by virtue of reversing the polarity of the magnets along the tile's edges, and shaken vigorously by hand for about 10 minutes until two spheres, each containing only one color scheme (see, FIG. 5b), have self-resolved and assembled into two capsids each composed of only one type of colored (homochiral) tile.

During this experiment, the self-assembly process took significantly longer time, usually less than 10 minutes. This result is the expected result, as the number of "infertile" (incompatible and thus unproductive collisions between tiles of opposite chirality) combinations is larger than the number of "constructive" (compatible) combinations.

Example 4

Models of Two Heterogeneous Capsomere Types Forming One Capsid

The fact that there are numerous ways to construct edge-complementarity in a dodecahedron (degenerate pentakis dodecahedron), utilizing distribution of polar elements such as magnetic or electrostatic fields, one can design tiles with different patterns of polarity on each edge of the pentagon, each with a distinct complementary edge mate. If the interface formed by any complementary pair is isostructural with all others, then any combination of 12 tiles with appropriately matched edges can form a complete, stable dodecahedral structure. This approach opens the possibility of forming self-assembling systems that produce a large diversity of uniquely patterned capsids.

To demonstrate this possibility, a system utilizing non self-complementary interfaces formed from opposite polarities was designed. For practical purposes, each polarity (edge type) was color-coded, one in black and the other in grey. According to this system, a black edge is compatible for binding with a grey edge but not with a black edge, and vice versa.

FIG. 6a presents a schematic illustration of the combinatorial scheme for constructing a pentakis dodecahedron from two tile types, having two edge types, marked with black and grey, wherein the dashed lines connect two edges which are in contact in the resulting pentakis dodecahedron. Using this color convention creates two populations of marked tiles, one, named "all-black", had 5 identical "black" edges, and the other, called "mixed", was composed of two "black" edges and 3 "grey" edges (see, FIG. 6a).

As can be seen in FIG. 6a, in order to form a pentakis dodecahedron from two edge types, there must be at least two tile types; two identical copies of one tile type referred to herein as an "all-black" tile type having 5 identical "black" edges", and ten identical copies of a "mixed" tile type having two "black edges" and 3 "grey edges". Any other tile combination would have an unequal number of "black edges" and "grey edges". Moreover, the "all-black" tile type can occupy only special positions on the pentakis dodecahedron, and must be positioned at opposite poles, having two tiles separating therebetween. The "mixed" tiles must be oriented in a specific way around each "all-black" pole tile. This unique configuration is dictated by the edges complementary, wherein each half pentakis dodecahedron, or hemisphere, exhibits "color-mirror" symmetry with respect to its counterpart.

FIG. 6b presents a photograph of 12 capsomere models which were fabricated using the same three-dimensional basic capsomere structure tiles. As can be seen in FIG. 6b, two types of tiles were fabricated, each having a different edge type configuration. According to the scheme presented hereinabove (see, FIG. 6a), the magnet polarity in one edge type was positioned so as to be compatible with respect to the magnet polarity of other edge type, namely the "black edge" type is compatible with the "grey edge" type. As can be seen in FIG. 6b, two copies of the "all black" tile type were fabricated and marked accordingly with five black color dots, and ten copies of the "mixed" tile type were fabricated and marked accordingly with two black color dots and three grey color dots.

FIG. 6c presents a photograph of a pentakis dodecahedron sphere (capsid) composed of the 12 tiles, 2 "all black and 10 "mixed" as described hereinabove.

Shaking 12 or more of these tiles, whether in stoichiometric proportions (2 to 10) or another, should result in the expected assembly of capsids with only two "all-black" tiles at opposite poles of the capsid sphere, and ten "mixed" tiles arranged in the band going around the sphere.

To estimate the relative time required for self-assembly, the number of ways this configuration of tiles could form an intact capsid was calculated. The "all-black" tiles can be positioned constructively $2! \times 5^2 = 50$ ways, and the "mixed" tiles can be positioned constructively $10! \times 2 = 7,257,600$ ways. Assuming that the relative assembly redundancy is a good estimate of the time required for self-assembly, an intact capsid model of a polivirus capsid composed of these two tile types would take $9.75E+15/(50 \times 7.26E+6) = 2.7E+7$ times longer to form. Given that the assembly time using only one type of identical tiles was about one minute, as presented hereinabove, one could expect the self-assembly experiment of a capsid, composed of these two tile types and effected by manual shaking, to take about 51 years.

Example 5

Models of Four Heterogeneous Capsomere Types Forming One Capsid

The physical demonstration of tile self-assembly presented hereinabove showed that the concepts used by viral capsids can apply to the macroscopic scale. The experiments utilizing two different tile types in combination, showed that such self-assembly can go beyond homogeneous assemblies to create diverse patterned closed containers, albeit at a considerably inefficient, thus slower, rate.

To demonstrate the possibility to devise a pentakis dodecahedron system having two edge types and four tile types, a virtual set of tiles was complied: one tile type, referred to herein as an "all-black" tile type, having 5 identical "black edges", a second tile type, referred to herein as an "all-grey" tile type, having 5 identical "grey edges", a third tile type, referred to herein as an "4b1g" tile type, having four "black edges" and one "grey edge", and a fourth tile type, referred to herein as an "4g1b" tile type, having four "grey edges" and one "black edge".

FIG. 7 presents a schematic illustration of three combinatorial schemes for constructing a pentakis dodecahedron from four tile types having two edge types, wherein each edge is marked with black or grey, and wherein the dashed lines connect two edges which are in contact in the resulting pentakis dodecahedron. As can be seen in FIGS. 7a-c, this system of four tile types can be arranged so as to form a pentakis dodecahedron in three patterns, meaning that the restriction on the tile adjacency, seen in the two-tile system, no longer applies, especially with respect to the two uniformly colored tiles.

Example 6

Chemical Closed Encapsulating Multimer Particle

Based on the capsomere models and the construction of a capsid model therefrom presented hereinabove, the possibility of applying the concepts of tile design to simpler molecular structures that can be chemically synthesized and constitute monomers which are capable of stochastic self-assembly so as to form a closed chemical multimer particle capable of encapsulating a small volume of space therein, was examined.

Figure 8:
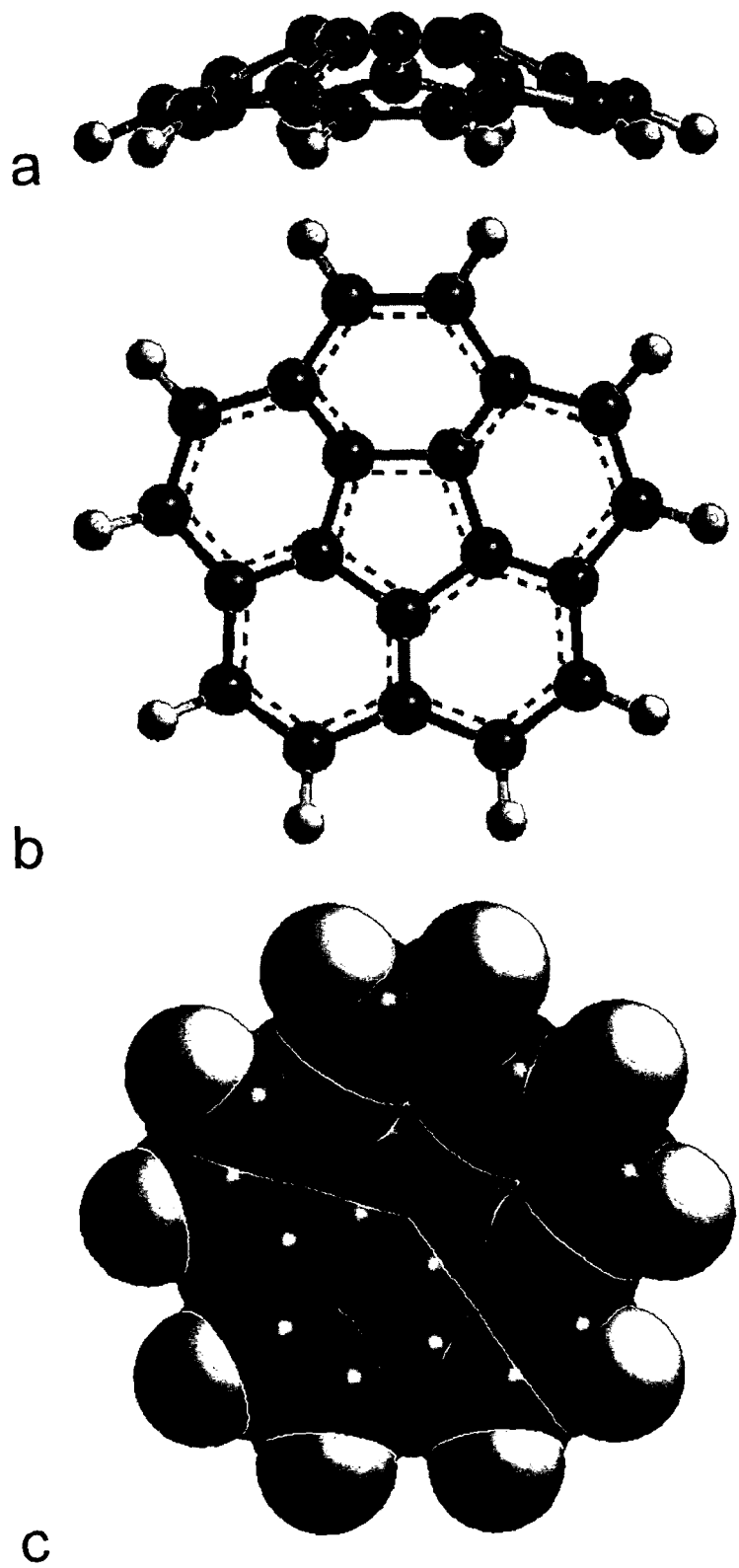
FIGS. 8a-c present molecular illustrations of a corannulene molecule, showing the natural curvature of corannulene as emphasized in a side view (FIG. 8a), the 5-fold symmetry in a "ball-and-stick" diagram (FIG. 8b) and a "space-filling" diagram of corannulene (FIG. 8c), demonstrating why corannulene is an ideal core molecule (atomic model unit) for a closed chemical multimer.

In order to explore the concept of self-assembly at the atomic scale, corannulene ($C_{20}H_{10}$) was chosen as a structural core exhibiting the appropriate symmetry, curvature and rigidity so as to act as a scaffold, as well as the synthetic possibilities to construct the chemical complementarity at the edges thereof. The aromatic skeleton of corannulene, which is composed of a central pentagon and 5 surrounding hexagons, is a rigid, 5-fold symmetric molecule with a suitable curvature (see, FIG. 8). The edge-complementarity was designed to stem from 5 sets of symmetrically distributed hydrogen donors and acceptors so as to form a directional affinity hydrogen-bond interaction between each monomer. To this end, sym-penta-γ-lactam-corannulene was chosen as an exemplary chemical monomer (see, Scheme 1 below).

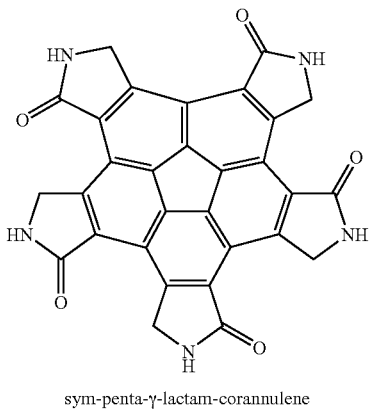

sym-penta-γ-lactam-corannulene

Twelve identical copies of auto-fabricated physical models of the aforementioned sym-penta-γ-lactam-corannulene (the self-assembly units) were made using the "solid" printer process utilizing a Z-Corp 510 printer using gypsum powder and color binder so as to produce model tiles, each having 38 mm edge length. These tiles were fitted with magnets having 1/16 inch length and 1/8 inch diameter. Each of the model units embodied all the key features of a sym-penta-γ-lactam-corannulene molecule, namely all the basic components (tiles) exhibiting the five-fold symmetry and the appropriate overall curvature. The parts of the model unit which represent atoms which are involved in hydrogen bonding at the edges of the sym-penta-γ-lactam-corannulene molecule were fitted with magnets, namely one set of magnets was placed on the outer surface representing each of the N-hydrogen atoms, and another set of magnets, pole-reversed with respect to the first set, was placed on the outer surface representing each of the oxygen atoms. The relative reversal of the magnet poles mimicked the polarity (directionality) of the hydrogen bond, namely to differentiate a donor-to-acceptor hydrogen bond from an acceptor-to-donor hydrogen bond.

Figure 9:
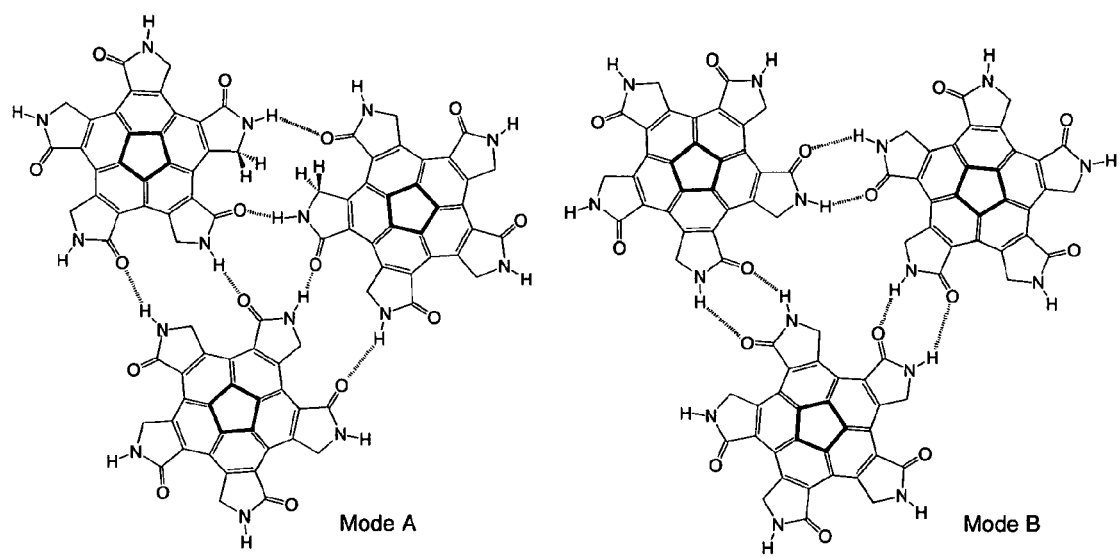
FIGS. 9a-c present the chemical monomer sym-penta-γ-lactam-corannulene, with a schematic illustration of two different modes of hydrogen bond network configurations between three sym-penta-γ-lactam-corannulene molecules (FIG. 9a), marked as Mode A on the left and Mode B on the right, with a photograph of two physical and magnet-fitted model units of a sym-penta-γ-lactam-corannulene molecule (FIG. 9b), wherein the model unit on the left-hand side of the photograph shows the concave face of the model unit and the magnets placed on the N-hydrogen and oxygen atoms, and wherein the model unit on the right-hand side shows the convex face of the model unit and obscuring the magnets due to the curvature thereof, and with a photograph of two physical models of dodecahedral hemispheres, each constructed from six identical magnet-fitted physical model units of sym-penta-γ-lactam-corannulene (FIG. 9c), wherein the hemisphere on the right-hand side of the photograph is built according to the hydrogen bond network configuration shown in Mode A, and wherein the hemisphere on the left-hand side of the photograph is built according to the hydrogen bond network configuration shown in Mode B.
Figure 9:
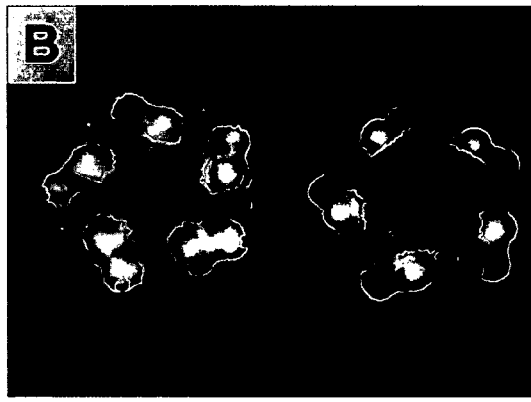
Figure 9:
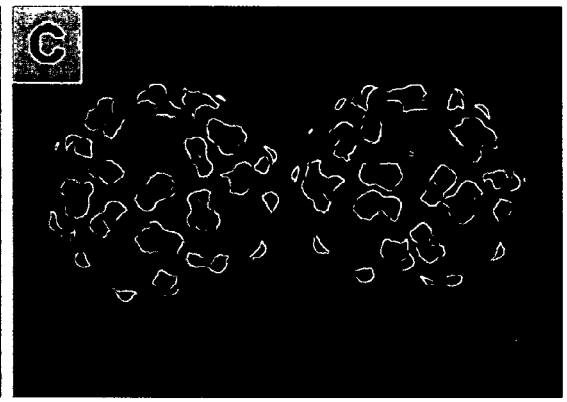

FIG. 9b presents a photograph of two physical models of a sym-penta-γ-lactam-corannulene molecule, namely two model units of a chemical monomer. As can be seen in FIG. 9b, the model unit on the left-hand side of the photograph is laid on the support surface like an upright bowl, showing its concave face and the magnets placed on the N-hydrogen and oxygen atoms, while the model unit on the right-hand side of the photograph is laid upside-down like an overturned bowl, showing its convex face and obscuring the magnets due to the curvature of the model unit.

FIG. 9a presents a schematic illustration of two different modes of hydrogen bond network configurations which three sym-penta-γ-lactam-corannulene molecules can form, referred to herein as Mode A and Mode B. As can be seen in FIG. 9a, these two possible hydrogen-bonding configurations give rise to two different "tiling" schemes wherein the tiles are skewed in one scheme with respect to the other, and are further distanced differently in the two schemes.

FIG. 9c presents a photograph of two physical models of dodecahedral hemispheres, each constructed from six identical magnet-fitted physical model units of sym-penta-γ-lactam-corannulene. As can be seen in FIG. 9c, the hemisphere on the right-hand side of the photograph, built according to the hydrogen bond network configuration Mode A (see, FIG. 9a) is slightly smaller and more tightly packed than the hemisphere on the left-hand side of the photograph, built according to the hydrogen bond network configuration Mode B (see, FIG. 9a). The actual models presented in FIGS. 9b-c were not formed by shaking the tiles together but rather assembled by hand.

These molecular models of relatively small molecules clearly substantiate the paradigm that the complex process of stochastic self-assembly of a chemical multimer can be modeled and predicted by using carefully designed physical model units of its chemical monomers.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of creating a closed and self-assembled multimer model structure, the method comprising:
    (a) providing a plurality of separate, non-connected structurally symmetric units that form a self-assembled multimer structure, each of said units having a plurality of at least one type of basic component, said basic components comprise at least one type of attachment entity being positioned in or on a portion thereof, said units having structural complementarity to one another so as to form the closed and self-assembled multimer structure upon inducing proximity and orientation of said attachment entities; and
    (b) encouraging by application of undirected kinetic energy said plurality of said separate, non-connected units to physically interact through random motion therebetween via said attachment entities, thereby creating the closed and self-assembled multimer structure;
    wherein self-assembly persists from a separate, non-connected state of the units to the formation of the closed multimer structure.

2. The method of claim 1, wherein the closed and self-assembled multimer structure is a physical model of a closed and self-assembled chemical multimer structure, whereas said structurally symmetric units are atomic model units of structurally symmetric chemical monomers that form said self-assembled chemical multimer structure.

3. The method of claim 2, wherein said attachment entities are for modeling chemical affinity moieties of said structurally symmetric chemical monomers.

4. The method of claim 1, wherein applying said kinetic energy is effected via a technique selected from the group consisting of shaking, agitating, afloating, mixing, tossing, tumbling and colliding.

5. The method of claim 1, wherein said attachment entities are directional.

6. The method of claim 5, wherein said attachment entities are selected from the group consisting of magnetic entities, electromagnetic entities, static charge entities, hook-and-loop entities, spline-and-groove entities and a combination thereof.

7. The method of claim 2, wherein said self-assembled multimer structure is selected from the group consisting of a model of a viral capsid and a model of a closed hull particle.

8. The method of claim 7, wherein said viral capsid has an icosahedral morphology.

9. The method of claim 7, wherein said closed hull particle has a morphology selected from the group consisting of tetrahedral morphology, icosahedral morphology, cubical morphology, octahedral morphology and dodecahedral morphology.

10. The method of claim 8, wherein each of said structurally symmetric units has a 5-fold rotational symmetry.

11. The method of claim 9, wherein each of said structurally symmetric units has a rotational symmetry selected from the group of 3-fold rotational symmetry, 4-fold rotational symmetry and 5-fold rotational symmetry.

12. The method of claim 1, wherein said structurally symmetric units are structurally identical to one another.

13. The method of claim 12, wherein a position and direction of said attachment entities in each of said basic components is identical.

14. The method of claim 1, wherein said structurally symmetric units comprise at least two different types of basic components.

15. The method of claim 14, wherein a direction of said attachment entities in one type of said basic components is reversed with respect a direction of said attachment entities in another type of said basic components.

16. The method of claim 15, wherein each of said structurally symmetric units has a 5-fold rotational symmetry and a direction of said attachment entities in one type of said basic components is reversed with respect a direction of said attachment entities in another type of said basic components.

17. The method of claim 16, wherein said structurally symmetric units comprise two different types of basic components.

18. The method of claim 1, further comprising determining if a self-assembled multimer structure is created, whereby creation of a closed and self-assembled multimer structure is indicative for the self-assembly process.

19. The method of claim 18, wherein the modeling of a self-assembly process is capable of predicting a structure of the closed and self-assembled multimer structure and predicting an effect of a structural change in at least one of said structurally symmetric units or at least one of said basic components or a change in at least one of said attachment entity.

* * * * *